(12) United States Patent
Angulo et al.

(10) Patent No.: US 9,195,748 B2
(45) Date of Patent: Nov. 24, 2015

(54) SYSTEMS AND METHODS FOR IDENTIFYING AND ANALYZING INTERNET USERS

(71) Applicant: SpotRight, Inc., Boulder, CO (US)

(72) Inventors: David Angulo, Boulder, CO (US); Lanier Ripple, Houston, TX (US); Nathan Halko, Boulder, CO (US)

(73) Assignee: SPOTRIGHT, INC., Boulder, CO (US)

( * ) Notice: Subject to any disclaimer, the term of this patent is extended or adjusted under 35 U.S.C. 154(b) by 106 days.

(21) Appl. No.: 13/773,165

(22) Filed: Feb. 21, 2013

(65) Prior Publication Data

US 2013/0218865 A1 Aug. 22, 2013

Related U.S. Application Data

(60) Provisional application No. 61/601,215, filed on Feb. 21, 2012, provisional application No. 61/719,307, filed on Oct. 26, 2012.

(51) Int. Cl.
*G06F 17/30* (2006.01)

(52) U.S. Cl.
CPC .................. *G06F 17/30864* (2013.01)

(58) Field of Classification Search
CPC ................................... G06F 17/30864
USPC .......................................... 707/709
See application file for complete search history.

(56) References Cited

U.S. PATENT DOCUMENTS

| 2010/0121707 | A1* | 5/2010 | Goeldi | 705/14.49 |
| 2010/0274815 | A1* | 10/2010 | Vanasco | 707/798 |
| 2010/0325107 | A1* | 12/2010 | Kenton et al. | 707/723 |
| 2011/0112957 | A1* | 5/2011 | Ingram et al. | 705/38 |
| 2012/0078906 | A1* | 3/2012 | Anand et al. | 707/737 |

* cited by examiner

*Primary Examiner* — Jorge A Casanova
(74) *Attorney, Agent, or Firm* — Neugeboren O'Dowd PC

(57) ABSTRACT

This disclosure describes systems, methods, and apparatus for generating reports enhancing an understanding of Internet users based on their generated content and actions taken by others in response to the generated content.

20 Claims, 14 Drawing Sheets

SYSTEMS AND METHODS FOR IDENTIFYING AND ANALYZING INTERNET USERS

CLAIM OF PRIORITY UNDER 35 U.S.C. §119

The present application for patent claims priority to Provisional Application No. 61/601,215 entitled "SOCIAL MARKETING PLATFORM" filed Feb. 21, 2012, and Provisional Application No. 61/719,307 entitled "SYSTEMS AND METHODS FOR IDENTIFYING AND ANALYZING INTERNET USERS" filed Oct. 26, 2012, both provisional applications assigned to the assignee hereof and hereby expressly incorporated by reference herein.

FIELD OF THE DISCLOSURE

The present disclosure relates generally to online data analysis. In particular, but not by way of limitation, the present disclosure relates to systems, methods and apparatuses for analyzing Internet users.

BACKGROUND

Many attempts have been made to better understand Internet users, often for marketing purposes. However, these attempts often look at evidence such as web page visits, which only provide an ability to infer what is going on within a user's mind. Most attempts have not looked at ways to directly monitor Internet user beliefs. Those that have are plagued by the challenges of collecting and analyzing enormous data sets.

For instance, social influence, or the capacity to affect others' character, development, or behavior, is subjectively analyzed via manual analysis of online content and manual associations of content with user profiles. Some current methods enable small numbers of influential users to be identified; however, the manual nature of these methods prevents them from being scaled into the tens and hundreds of millions. Other solutions use crowdsourcing or curating to partially overcome the scalability issues associated with manual solutions to these large analysis challenges (e.g., KLOUT and KRED).

SUMMARY OF THE DISCLOSURE

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

Some embodiments of the disclosure may be characterized as a server system comprising a network interface, a memory, and a processor. The network interface can receive product, service, or customer data from a client, receives a query from the client, and returns a report of social profiles to the client. The memory can store a searchable social profile datastore having one or more social profiles. The processor can run an API, a crawler module, a parser, an analysis module, and a scoring module. The API can receive the product, service, or customer data from the client via the network interface, can receive a query from the client via the network interface, and can return a report of social profiles to the client in response to the query via the interface. The crawler module can collect content and raw data from the Internet based on the product, service, or customer data. The parser can parse the content and raw data into terms. The analysis module can compute one or more of the following for each term: a reach value, a relevance value, and an impact value. The scoring module can compute scores for one or more social profiles for each term based on the one or more of reach value, relevance value, and impact value. The scoring module can further add to or update the one or more social profiles with the scores.

Other embodiments of the disclosure may also be characterized as a method for generating reports enhancing an understanding of Internet users based on their generated content and actions taken by others in response to the generate content. The method can include collecting content or other raw data via a crawler module that accesses webpages from a network interface of a server system. The method can further include associating the content or other raw data with a social profile residing in or being added to a memory. The method can yet further include calculating scores the social profile based on terms parsed from the content or other raw data. The method can yet further include receiving a query, via the network interface, for users fitting one or more contexts. The method yet further can include identifying the users fitting the one or more contexts. The method can also include returning a report in response to the query and transmitted through the network interface, having the users.

BRIEF DESCRIPTION OF THE DRAWINGS

Various objects and advantages and a more complete understanding of the present invention are apparent and more readily appreciated by referring to the following detailed description and to the appended claims when taken in conjunction with the accompanying drawings:

DETAILED DESCRIPTION

Figure 1:
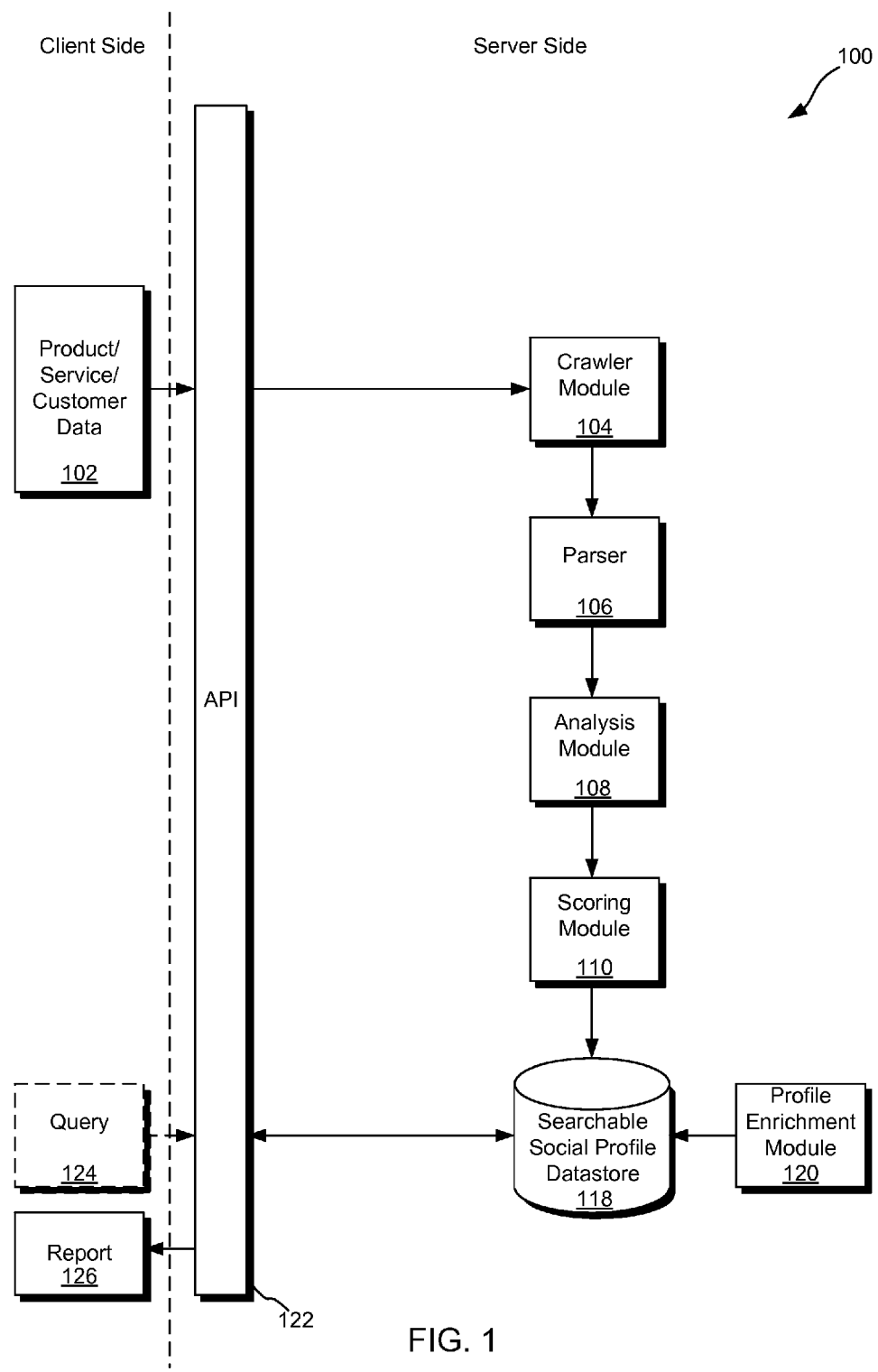
FIG. 1 illustrates one embodiment of a system that collects content or other raw data, associates the content with one or more social profiles and/or creates new profiles, and returns reports showing contextual scores and/or rankings for one or more users in one or more contexts.

The word "exemplary" is used herein to mean "serving as an example, instance, or illustration." Any embodiment described herein as "exemplary" is not necessarily to be construed as preferred or advantageous over other embodiments.

For the purposes of this disclosure, "influence" represents a social influence of an Internet user expressed over the Internet.

For the purposes of this disclosure, a "term" is a single word parsed from raw data collected by a crawler module. A "context" is a category that describes a combination of one or more terms. Terms can be described by different contexts depending on how they are combined with other terms (e.g., "compact cars" v. "maintenance for cars"). In some embodiments, a context comprises exact terms or combinations of terms, while in other embodiments, contexts can describe one or more terms without using the exact term(s). In one embodiment, a single context is a stem (e.g., "swim" is a term defining the context for any content including the words "swim", "swimming", "swam", etc.).

For the purposes of this disclosure, "contextual influence" is the influence between users in a group where inclusion in the group is determined by context. Assuming a context can include up to six words, there around $10^{30}$ different contexts in the English language and each user can be part of one or more of those contexts and can exert different influence in each context.

There are numerous analytics platforms known that are configured to analyze Internet users and generate data and reports on those Internet users. However, those platforms typically look at data such as web activity and purchasing activities (e.g., via credit card histories). The herein disclosed systems, methods, and apparatus diverge from the art by producing data (e.g., reports) on Internet users that enhance an understanding of those users based on content created by those users, and actions taken by users relative to the created content. In particular, scores for reach, relevance, and impact in a variety of contexts, can be generated and used to derive various scores that help enhance an understanding of Internet users based on their content and actions taken by others in response to that content. Other scores can be used in addition to, or as alternatives to, any one or more of reach, relevance, and impact. This data can be used to supplement traditional analytics and data such as credit card purchase histories.

This new type of data can be used, for instance, to help better understand which Internet users have the most influence on other Internet users, which is particularly important to marketing entities. As another example, the systems, methods, and apparatus can also be used to predict an Internet user's propensity to take an action such as to buy a product. The new type of data can also be used to flesh out user profiles that a company such as NIKON or AMAZON already have built and populated. This disclosure focuses on the systems, methods, and apparatus used to generate the new type of data, and leaves to other discussions, methods for using the data.

Figure 9:
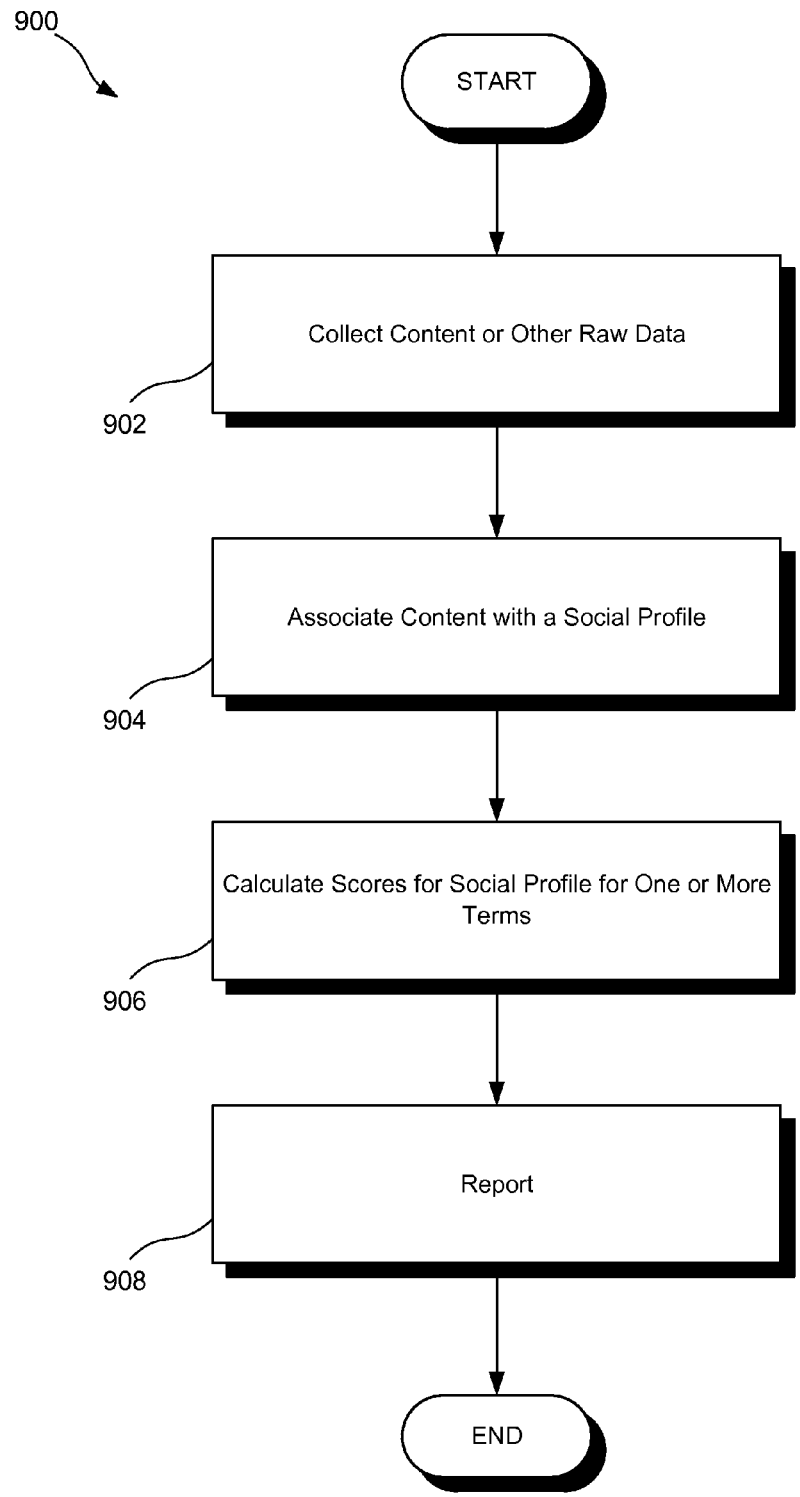
FIG. 9 illustrates one embodiment of a method for generating the new type of data.

FIG. 9 illustrates one embodiment of a method for generating the new type of data. First, content or other raw data can be collected in an operation 902 (e.g., via web crawler) and then associated with social profiles in an operation 904. Scores can be calculated for each social profile for each of one or more terms parsed from the collected content in an operation 906. The scores can be reported for certain contexts where a context describes a combination of one or more of the terms parsed from the collected content. This reporting can be done in operation 908.

The content can include webpages and any subcomponents of a webpage. TWITTER tweets, YOUTUBE comments, YOUTUBE tags, blog posts, forum posts and comments, and social media public profiles, are just some examples of content that can be collected in the collect operation 902. In some cases, user actions can also be collected. For instance, the actions of retweeting or commenting on a YOUTUBE video are actions that can be collected in the collect operation 902.

Scores can be determined for any or all terms parsed from the collected content. For instance, where a tweet says, "just bought Nikon D600 and high ISO performance is amazing," the parsed terms may include "Nikon," "D600," and "ISO." Scores may be assigned to the author of the tweet for each of "Nikon," "D600," and "ISO." The scores can include contextual influence scores, or propensity to buy scores, to name two non-limiting examples.

The reports can then provide contextual scores that are based on the scores assigned to each term parsed from the collected content. For instance, and recalling the NIKON tweet example, a report could include a score for a context called "Nikon cameras" and another for a context called "enthusiast cameras." An alternative context could simply be "Nikon D600." Continuing with the influence and propensity to buy examples, the reports can include lists of top Internet users in terms of contextual influence scores or in terms of propensity to buy scores for one or more contexts. Reports can also include lists of Internet users that fit particular contexts (e.g., travel, automotive, home furnishings). Often, the context(s) is selected by or provided by a marketing or retailing entity. In some cases, such entities are looking to enhance knowledge of existing or potential customers.

Reports can be automatically generated, although in some cases, reports can result from a specific query for Internet users of one or more contexts. For instance, NIKON may provide e-mail addresses for existing customers and potential customers. Content is then collected and associated with social profiles that are created or that existed for the existing and potential customers, and scores are calculated for each social profile for each of one or more terms parsed from the collected content. A report can then be presented to NIKON providing contextual scores for the existing and potential customers in the one or more contexts (e.g., "entry-level cameras"). After receiving the report, NIKON may realize that it wants further information on the existing and potential customers, but for different contexts (e.g., "enthusiast cameras" and "professional-level cameras"). So, NIKON may make a query for a report showing top influencers given the contexts "enthusiast cameras" and "professional-level cameras." Another report can be returned showing top influencers based on only those scores for terms that are found to match these two contexts (e.g., terms like "D600" and combinations of terms like "full-frame cameras" and "pro camera").

The scores can be determined for one or more influencers based on one or more of the following three values: "reach," "relevance," and "impact." Each of the three scores is calculated relative to the terms parsed from the collected content in operation 902 and further for each Internet user in a set of Internet users (e.g., those associated with e-mail addresses provided by a marketing entity or retailer). In the case of determining an influence of an Internet user, the higher the reach, relevance, and impact, the more likely they are to be influential on other Internet users.

For the purposes of this disclosure, "reach" represents how connected a user is to other users relative to a term. Reach represents both a number of relationships that a user has to other users as well as a quality of those relationships. In some embodiments, reach can be calculated from a graph that includes nodes connected by edges, where each node represents a user and each edge represents a relationship between two users (or nodes). The graph can be used to calculate reach scores for each user, for instance by counting a number of nodes that a user is connected to.

For the purposes of this disclosure, "relevance" indicates how germane a user's content is to a term. For instance, given the terms, "camera", a user who publishes content about photography will often have greater relevance than a user who publishes content about French Film History. Relevance is based upon a quantity of content generated over a period of time that is germane to a term and how relevant each piece of content is to the term.

For the purposes of this disclosure, "impact" indicates how much measurable action a user's content causes relative to a term. This can be measured by analyzing the effects of a user's content relative to a term, for instance, by analyzing retweets, shares, comments, likes, links, etc that also mention the same term.

FIG. 1 illustrates one embodiment of a system that collects content or other raw data, associates the content with one or more social profiles and/or creates new profiles, and returns reports showing contextual scores and/or rankings for one or more users in one or more contexts. The system 100 includes a client side and a server side. The client side can provide or select seed information for a crawler module 104, such as product or service descriptions or customer data (e.g., e-mail addresses for customers and potential customers), and the server side can return a report 126 providing information about Internet users based on analysis of content pulled by the crawler module 104. For instance, the report 126 can list users who are most influential relative to a certain type of product or a list of users most likely to buy a certain type of product. The client side can also optionally make a query 124 that leads to generation of one or more further reports 126 based on the query 124.

In particular, a client on the client side can provide or select product descriptions, service descriptions, and/or customer data 102. The client side can include a remote computer operated by a seller of goods and/or services or a marketing entity. The client side can either select the product/service/ customer data 102 from selection options presented by the server side through an API 122, or the client side can provide this data 102 when prompted to by the API 122. For instance, the client side may be presented with the terms "shoes," "food," and "smartphones," and the operator of the client side may select "shoes." The data 102 is then used to guide a crawler module 104 which collects content (e.g., webpages) and other raw data (e.g., metadata). For instance, if a product selection for "sleds" is made to the API 122, then the crawler module 104 may be directed to crawl for webpages where users have mentioned the words, "sleds," "sledding," or "snow."

In some embodiments, the server side can use the data 102 to determine if there are sufficient social profiles in a searchable social profile datastore 118 to meet the needs of the client side. If there are, then a report 126 can be returned to the client side without further server side action, and/or the client side can be prompted to submit a query 124. If it is found that there are insufficient social profiles in the searchable social profile datastore 118, then a crawler module 104 can crawl a plurality of universal resource locators (URLs) and collect content and other raw data. The URLs can be generated based on the product, service, and/or customer data 102.

The crawler module 104 can return content (e.g., webpages) or other raw data from the URLs that are crawled. The parser 106 can then parse the raw data and pass this parsed data (e.g., terms and embedded links) to an analysis module 108, which can use the parsed data to compute values such as, but not limited to, reach, relevance, and impact. The results of the analysis module 108 can be passed to a scoring module 104 that determines scores for each social profile for each term parsed by the parser 106. For instance, the scoring module 104 can determine contextual influence scores.

The values from the analysis module 108 and the scores from the scoring module 110 are then used to populate social profiles in the searchable social profile datastore 118, where each value and score is associated with a social profile and each social profile includes values and scores for all the terms parsed by the parser 106. Sometimes, a new social profile has to be created, before values and scores can be added to the profile.

Before, in parallel to, or after the analysis module 108 and the scoring module 110 determine values and scores, respectively, the analysis module 108 can create new profiles in the searchable social profile datastore 118, populate the new profiles, and update existing profiles. Populating and updating can include adding or modifying values, scores, and content or other raw data of a social profile. Additionally, a profile enrichment module 120 can determine actual names to assign to each social profile. Once the social profiles are populated or updated and actual names are assigned to each profile, the social profiles are ready to be used in determining contextual scores and generating the report 126 and responding to the optional query 124.

The following provides further details of the various components of the system 100. The client side can involve all components and processes carried out by or on a client computing device such as a remote web browser. The server side can include all components and processes carried out by or on a server or set of servers providing services to the client side.

Customer data can include records for existing or potential customers including fields such as e-mail address, handles for customers, or URLs of webpages where the customer has created content, demographics, interests, and buying habits/ trends, to name a few. Recency, frequency, and monetary value of customer transactions are other examples of customer data.

The crawler module 104 can be embodied in a web crawler such as, but not limited to, Apache Nutch. The crawler module 104 can access a plurality of webpages and create a copy of each visited webpage. The copies can be provided to the parser 106 and stored in the crawler module 104.

The crawler module 104 can operate via a single computing device or a set of computing devices operating in parallel thus enabling faster crawling. The crawler module 104 can crawl most publicly-accessible web pages. While the crawler module 104 can be seeded by the data 102, it can also continually run, or run in the background, in order to expand the searchable social profile datastore 118. In some embodiments, there may be feedback instructions from one or more of the mentioned modules or the searchable social profile datastore 118 guiding the crawler module 104 on further crawling tasks.

When the system 100 is in early operation and the searchable social profile datastore 118 is not very large, the client side will typically have to wait longer for a report 126 since the crawler module 104 will have to collect content or other raw data in order to generate sufficient social profiles to generate a useful report 126. Over time, the searchable social profile datastore 118 will expand and client side requests will be met in shorter periods of time since the system 100 can generate reports 126 based on the existing searchable social profile datastore 118, rather than having to expand the datastore 118 in response to a client side request.

Additionally, the parser 106 can extract information from content or other raw data provided by the crawler module 104 such as text that is visible on a webpage (e.g., comments, blog posts, public profiles) and metadata (e.g., WORDPRESS embeds profile information into links from a WORDPRESS webpage). This content or other raw data can then be passed to the analysis module 108.

The searchable social profile datastore 118 can include fields such as real name, location, contact information, demographics, and tastes, to name a few. It can also include values from the analysis module 108 and scores from the scoring module 110, where both can be mapped to corresponding social profiles. These social profiles can also include content and other raw data from the crawler module 104 and/or the parser 106.

Turning to the report 126, this may also include ordered lists or sets of users that fit within certain contexts or categories, or alternatively, the report 126 may include contexts or categories that are associated with certain users. The report 126 can include one or more of the following data fields: name; scores (e.g., contextual influence, propensity to purchase product X); reach, relevance, and impact; recent searches where the user has been discovered; and URLs where the user has published content. Additionally, a report 126 may include a quantitative assessment of a confidence that the system 100 has in the placement of a user into a context or category in the report 126. The report 126 may also include any other scores or values that were calculated, such as reach, relevance, and impact.

Figure 2:
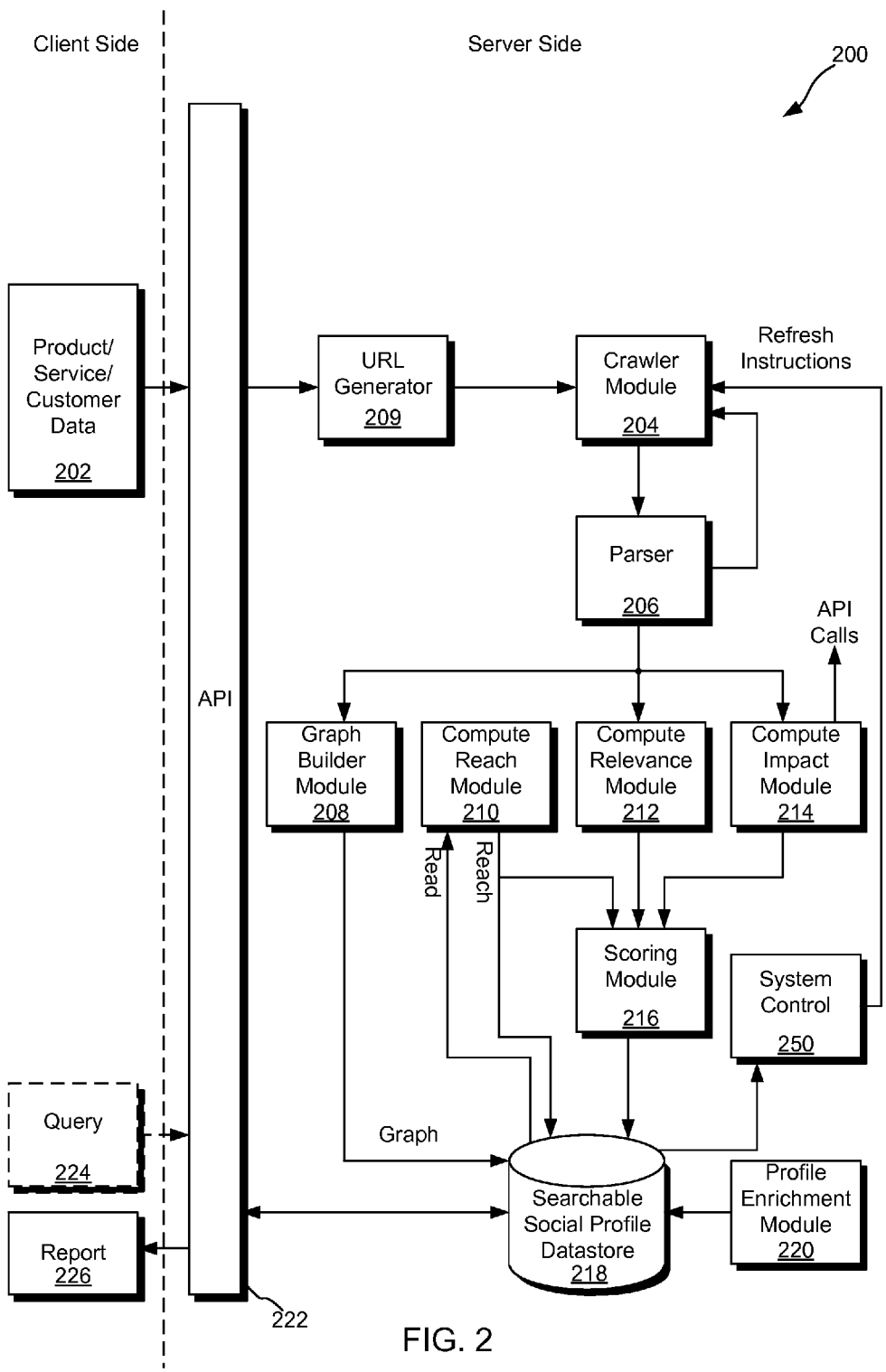
FIG. 2 illustrates another embodiment of a system that collects content or other raw data, associates the content or other raw data with one or more social profiles and/or creates new profiles, and returns reports showing contextual scores for one or more users in one or more contexts.

FIG. 2 illustrates another embodiment of a system that collects content or other raw data, associates the content or other raw data with one or more social profiles and/or creates new profiles, and returns reports showing contextual scores for one or more users in one or more contexts. The system 200 operates similarly to that of system 100 in that a client side provides or selects descriptions of products, services, and/or customer data 202 via an API 222 that seeds a crawler module 204. Here, there is also a URL generator 209 that generates URLs from the data 202, and passes the URLs to the crawler module 204. The crawler module 204 again obtains content and other raw data, and a parser 206 parses what the crawler module 204 returns. In some instances, the parser 206 can pass instructions and URLs back to the crawler module 204 seeding further crawls. However, instead of an analysis module 108, here there are modules for computing reach, relevance, and impact (a compute reach module 210, a compute relevance module 212, and a compute impact module 214, respectively).

There is also a graph builder module 208 for building a graph datastore that is used to populate profiles in the searchable social profile datastore 218 which maps reach, relevance, impact, and content and other raw data to users and their social profiles as well as relationships and relationship metadata between the profiles. A profile enrichment module 220 enhances profiles in the searchable social profile datastore 218, for instance, by determining actual names to associate with each social profile. The graph datastore can also be used to compute reach. The reach, relevance, and impact values can be passed to a scoring module 216 which determines scores that can be saved in a searchable social profile datastore 218. One or more reports 226 can then be generated from the searchable social profile datastore 218 and returned to the client side via the API 222. The reports 226 can be based on contextual scores calculated from the scores in the searchable social profile datastore 218. The client side can again optionally make queries 224 via the API 222.

The following discusses the various components of the system 200 in greater depth. As noted above, the parser 206 can send information back to the crawler module 204 to guide the crawler module 204 in further crawls. This information may include URLs that are found within content or other raw data obtained by the crawler module 204 or may be URLs generated from data or metadata in the content or other raw data obtained by the crawler module 204. For instance, the crawler module 204 may return a YOUTUBE comment that references a link to a product review, and this link can be returned as a URL to the crawler module 204 for further crawling. In some embodiments, the parser 206 parses terms from the content collected by the crawler module 204 as well as monitors term frequency. Both the parsed terms and term frequency can be stored in the searchable social profile database 218.

The parser 206 passes parsed content and other raw data to the graph builder module 208. The graph builder module 208 builds a graph datastore (e.g., see FIG. 4) comprising nodes (users) and edges (relationships between users) and stores the graph datastore in the searchable social profile database 218. Initially, a node is created for each crawled URL, but later, the graph builder module 208 merges nodes that it deems are attributable to the same user. For instance, where two blog posts both contain 'melinks' to the same user, the nodes representing the two blog posts can be merged.

Figure 4:
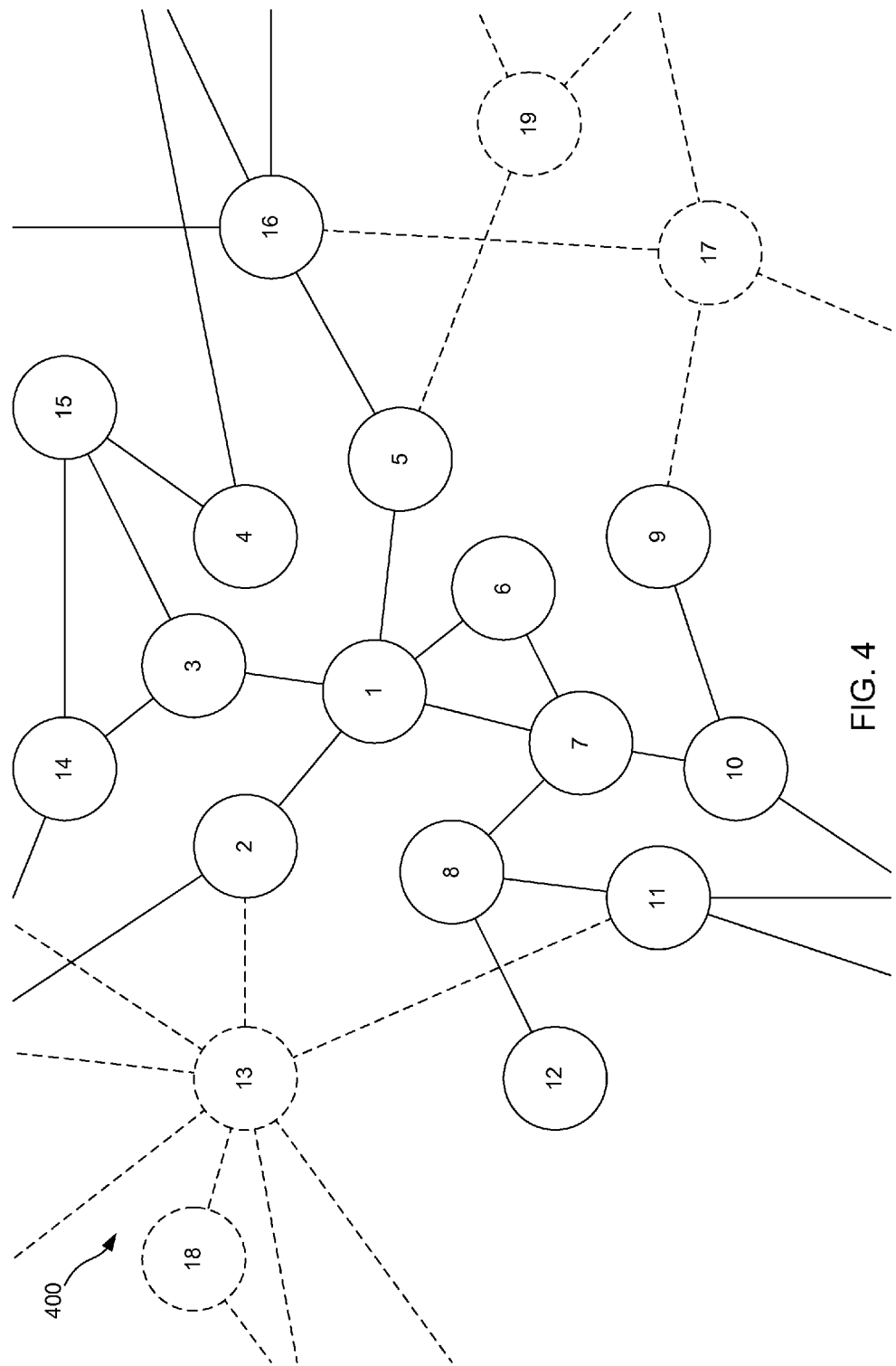
FIG. 4 illustrates a graph datastore having nodes (users) and edges (relationships) where new nodes and new edges (e.g., nodes 13, 17, 18, and 19 and related new edges) are added to the graph datastore as a result of newly-crawled content.
Figure 5:
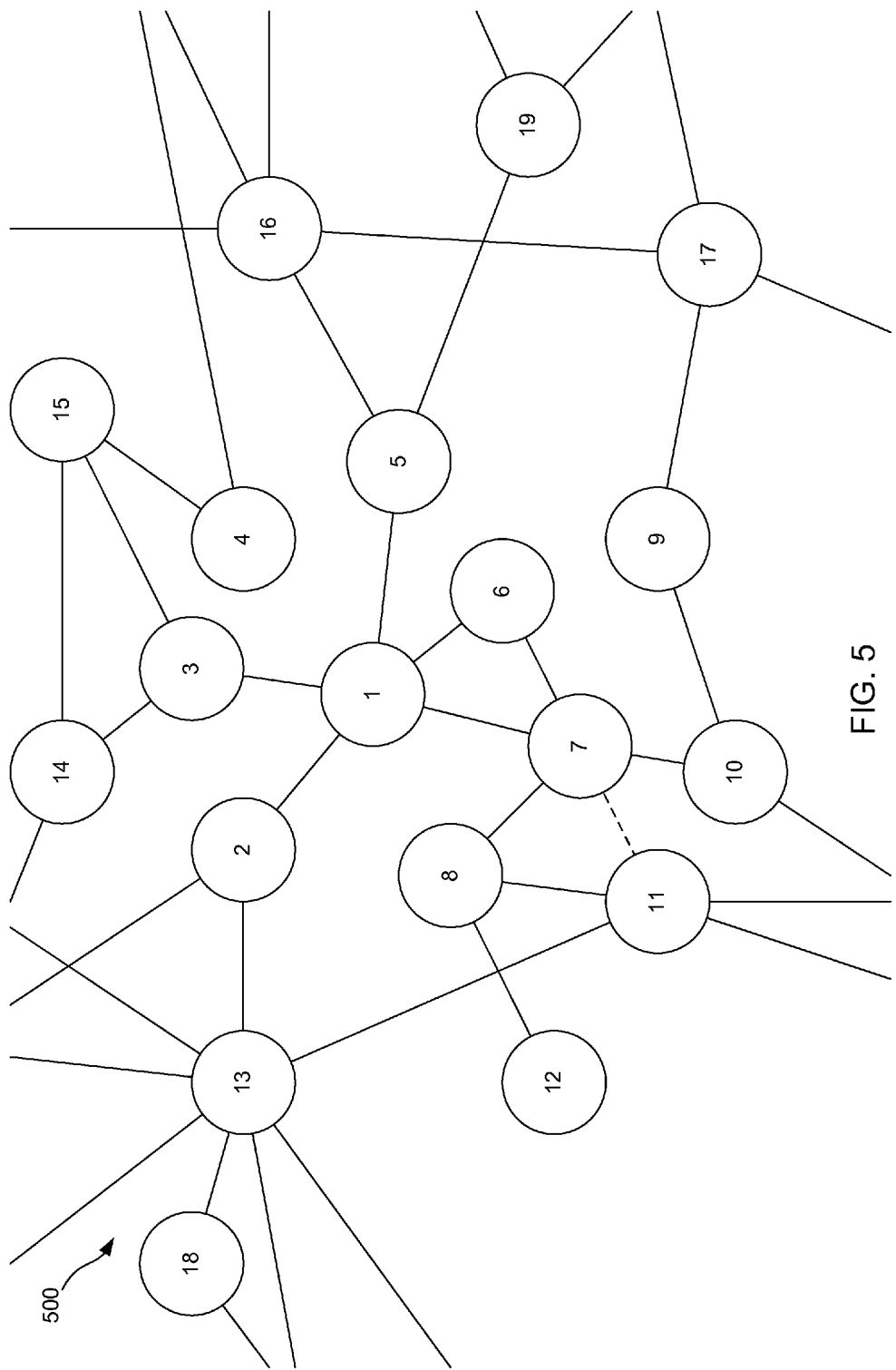
FIG. 5 illustrates the graph datastore of FIG. 4, but with the addition of a new edge between nodes.
Figure 6:
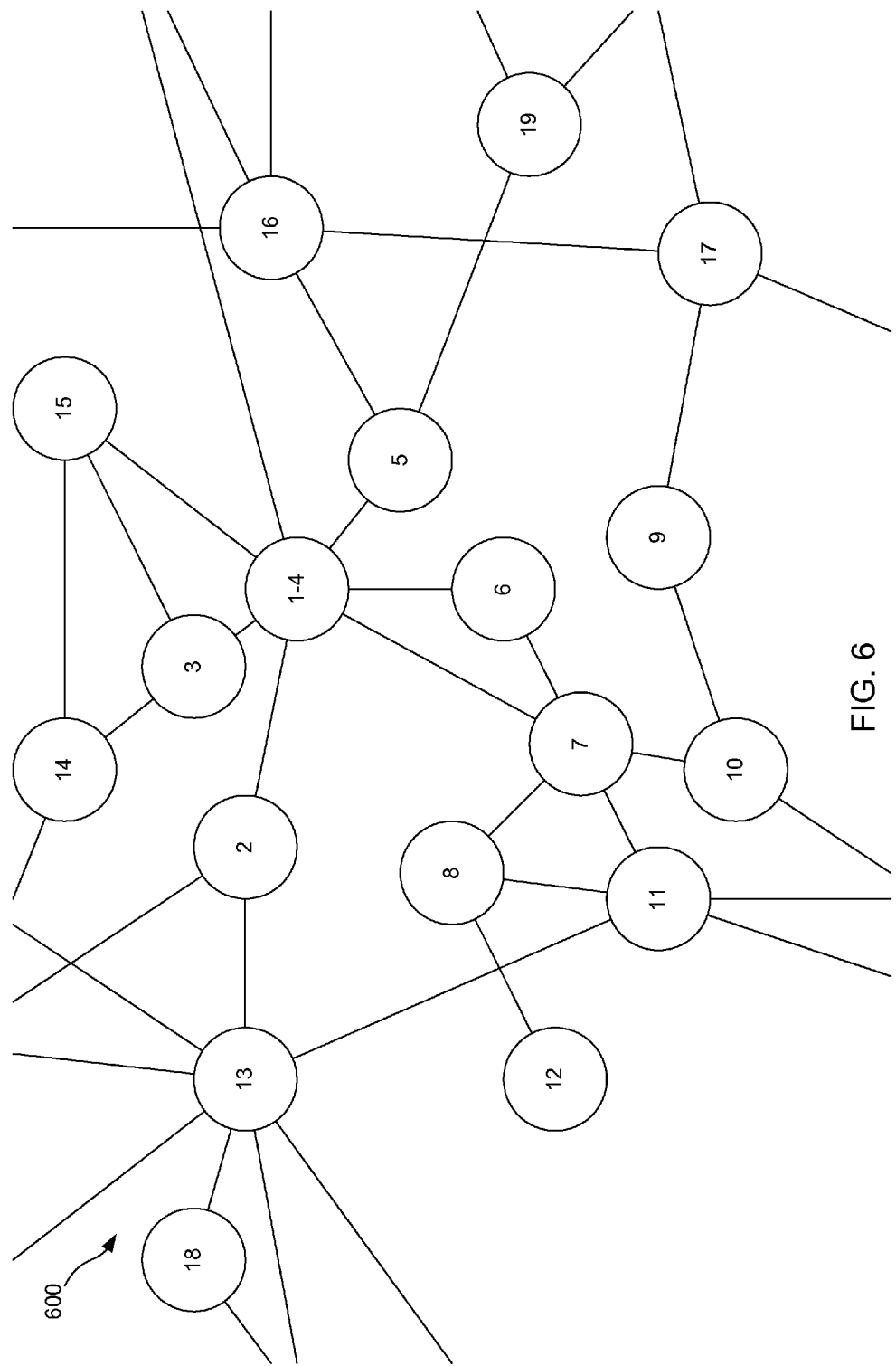
FIG. 6 illustrates the graph datastore of FIG. 5, but with the merger of two nodes.
Figure 8:
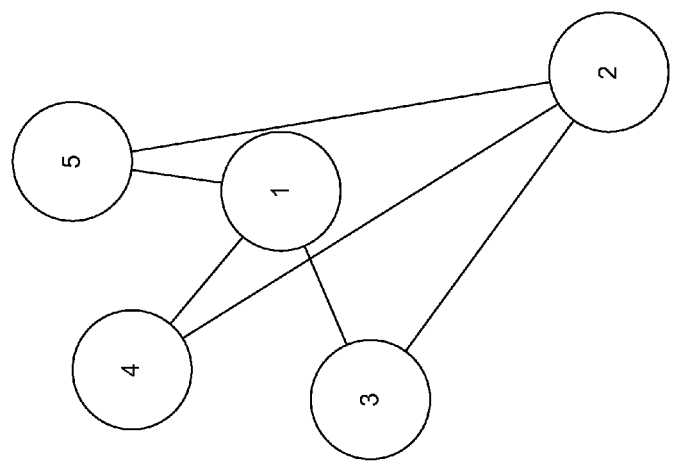
FIG. 8 illustrates a portion of a graph datastore showing some nodes and edges between those nodes.

The graph builder module 208 adds nodes and edges to the graph datastore whenever the crawler module 204 returns content or other raw data. For instance, FIG. 4 illustrates a graph datastore having nodes (users) and edges (relationships) where new nodes and new edges (e.g., nodes 13, 17, 18, and 19 and related new edges) are added to the graph datastore as a result of newly-crawled content. A relationship can be evidenced by a variety of factors such as actions (e.g., referencing another TWITTER username in a tweet). Multiple actions can give rise to a single edge. In some cases, newly-crawled content may merely lead to the addition of a new edge, for instance, as illustrated in FIG. 5 between nodes 7 and 11.

Where two nodes are recognized as being associated with content that was created by the same user, the two nodes can be merged, as is illustrated in FIG. 6, where nodes 1 and 4 have been combined into node 1-4. Determining whether to merge two nodes can be performed by analyzing common attributes between nodes. Commonality between edges is another factor that can be used to determine if nodes should be merged. For instance, even where not all attributes are the same for two nodes, if all or most edges are common for two nodes, then it is likely that the two nodes are the same and should be merged. For instance, in FIG. 8, nodes 1 and 2 may be merged since their edges connect to the same three nodes. Node merger also entails merger of social profiles in some cases since newly-crawled webpages may lead to the discovery that two previously-created nodes, and their corresponding social profiles, should be merged.

Node creation can be cautious—a node is created for every crawled URL regardless of authorship; node merger is less cautious—nodes are merged whenever a threshold criterion for merger is met.

Separate from node merger, is the task of associating real user names with nodes and their associated social profiles. Actual user names (e.g., "John Smith") are metadata that are parsed from webpages and stored in the searchable social profile datastore 218. The profile enrichment module 220 can be configured to determine proper names for each social profile. While some content is easily associated with a user's actual name, such as a tweet, other content is harder to tie to a user's actual name. For instance, a blog post written under a pseudonym or forum comments under arbitrary usernames. In some cases, there may be more than one author for a single piece of content, and hence two authors may be assigned to a single node. Other difficult situations include ones where there are two or more authors of a piece of content, and one author has an existing social profile while the other does not. The profile enrichment module 220 can utilize a 'best guess' algorithm to determine an actual name most likely to be associated with each social profile.

Once the graph datastore has been created, the compute reach module 210 reads the graph datastore from the searchable social profile datastore 218 and determines a reach value for each node relative to each term parsed by the parser 206 for the URL that underpins each node. Reach values can then be passed to the scoring module 216 and stored in the searchable social profile datastore 218. Reach represents a size and strength of a user's social graph for a given term. There are a variety of ways to compute reach. For instance, reach can be a function of unique pathways (a series of one or more consecutive edges) between a node and every other node in the portion of the graph datastore being analyzed. In other words, each pathway is assigned a score and the reach for a node is a function of the scores for each pathway to or from the node.

In another embodiment, reach may be based on a number of unique pathways between a node and each other known node, where only a single pathway between any two nodes is considered. For instance, even though there are at least two unique pathways between node 1 and node 7 (1-7; 1-6-7), the reach score may only be based on one of these pathways (e.g., the shortest pathway).

Each pathway can have different effects on the reach value based on the quality of the relationships that the pathway represents. For instance, reach may be inversely related to a number of edges in a pathway since more edges mean greater degrees of separation between users. Individual edges can also have a quality, which may be reflected in a score or weight applied to each edge. For instance, a retweet may carry less weight than an action of following another user on TWITTER. Various other algorithms can also be used to determine a quality of relationships between nodes (e.g., the effect that a unique pathway between the two nodes has on the reach score for those nodes). Thus, score for a pathway may be a weighted sum of the edges in a pathway, and in this way can reflect both degrees of separation between users as well as a quality of the relationships connecting users.

In one embodiment, an all-pairs shortest path algorithm can be used, to determine a shortest pathway between nodes in a graph datastore. The all-pairs shortest path algorithm determines whether there is a pathway between any two nodes and if so, determines what the minimum number of edges between those two nodes is. Traditional methods of determining distances between nodes in a changing graph perform an all-pairs shortest path calculation (or similar distance-measurement) after every edge is added to the graph. This causes numerous problems that have not been solved in the art. This disclosure uses a method whereby a plurality of edges are added to the graph and then an iterative all-pairs shortest path algorithm is executed. In this way, reach scores for nodes are updated after a plurality of nodes and/or edges have been added to the graph, rather than updating reach scores after every node and/or edge is added. This enables the scalability of the system 200 that some in the industry (e.g., GOOGLE) have said was not practical.

Figure 7:
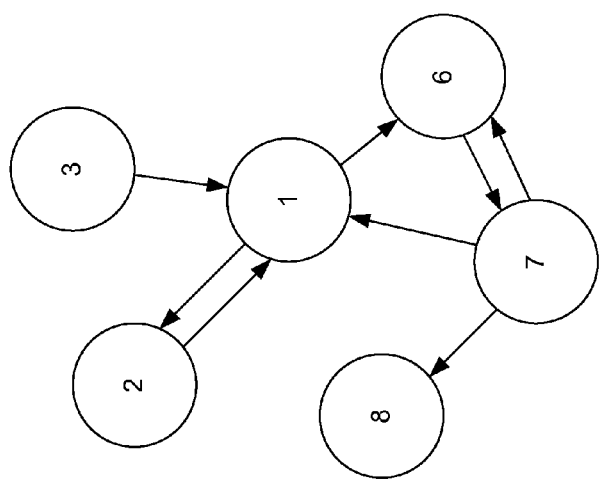
FIG. 7 illustrates the directionality of relationships between nodes.

In some embodiments, relationships between nodes can be directional as shown in FIG. 7. For instance, following someone on TWITTER is a one-way relationship. However, when having contacts on LINKEDIN requires reciprocation from another user, this is a two-way relationship. Reach scores can be affected by the directionality of the relationships between users. For instance, pathways between nodes may only exist where there is a continuous series of edges in the same direction.

Reach can also be calculated for different terms for each user. Thus, reach values may differ for different terms given the same graph datastore. In other embodiments, a pathway may only be considered in a reach score if all, or some threshold number, of nodes in the pathway are associated with the relevant term.

In some embodiments, reach can be calculated for each user relative to a portion of or relative to all nodes. For example, where computing resources are to be saved, reach may only be calculated based on pathways having less than a threshold number of edges. In another example, the portion of all nodes can include only those nodes for a customer set provided by the client side (e.g., those nodes corresponding to a list of e-mail addresses for existing customers of the operator of the client side).

The compute relevance module 212 computes a relevance score and passes this to the searchable social profile datastore 218. In some embodiments, an inverted index of user-created content can be mined to ascertain relevance.

A compute impact module 214 takes the parsed content and other raw data and calculates impact values which are passed to the searchable social profile datastore 218. Impact can be determined by calling APIs of content sharing sources (e.g., DISQUS, TWITTER) that return data indicating how many actions have been taken in response to published content. The API calls can be carried out via the compute impact module 214. The API calls may also return identifications of the users who take actions in response to published content and/or what the actions were. For instance, an API call to TWITTER may return lists of users who retweeted a tweet, and an API call to DISQUS may return lists of users who are active within a forum. The APIs may also return timing data for each action taken relative to a piece of content. The effect of actions on the impact score can be weighted by a time that elapsed between the content creation and the responding action.

The types of actions taken in response to a piece of content can be categorized and weighted. For instance, when a first user writes about a second user's blog post, that action may carry greater weight in determining impact than a third user's mere viewing of the second user's blog post. In some cases, actions taken in response to a piece of content may only include other pieces of content rather than all types of actions.

In some embodiments, impact can look not only at a quality and quantity of actions taken in response to a piece of content, but also the relationship between the user who created the content and the user who took action in response thereto. For instance, an algorithm may give great weight to users who take action in response to content and are far removed from the author (e.g., one's influence is likely greater when non-friends and family respond to content than when mere friends and family respond). Thus, the weight assigned to each action taken in response to a piece of content towards the impact score may be based in part on a number of edges between the node representing a user that authored the content and the node representing a user that responded to the content. This algorithm can alternatively be incorporated into the scoring module 216 and thus used during computation of score rather than during computation of impact value.

By making these API calls and receiving data in return, the compute impact module 214 collects a set of data that can be analyzed to determine what impact a piece of content had on other users. In some embodiments, a depository of content and metadata can be mined to calculate impact (see, e.g., a content metadata datastore 340 in FIG. 3).

Reach, relevance, and impact (and/or other scores) are passed to the scoring module 216 where they are used to determine a score (e.g., influence or propensity to buy) for each of a plurality of nodes and each of a plurality of terms. The scores are stored in the searchable social profile datastore 218 and mapped to corresponding social profiles. The searchable social profile database 218 thus comprises the graph datastore, where each node of the graph datastore includes, or is mapped to, a social profile that can include any one or more of: metadata, scores, reach value, relevance value, impact value, demographics, contact information, name, geography, social handles, outlets, and other profile data.

The score module 216 can apply a variety of algorithms to calculate scores and apply various weights to each of reach, relevance, and impact. For instance, the following: A*reach+B*relevance+C*impact, where A, B, and C are weights. Another example is: B*reach*(A*reach+C*impact). These are just two examples of the multitude of algorithms that the scoring module 216 can use. Furthermore, they highlight the fact that weights can be applied by the compute reach, relevance, and impact modules 114, 116, 118 or by the scoring module 216. In an alternative embodiment, weights for reach, relevance, and impact can be applied in the compute reach module 210, compute relevance module 212, and the compute impact module 214, respectively.

Scores can be calculated for each user and for each term parsed from content generated by that user. For instance, each node may have 300-1000 scores, where each score is determined for a different term. In some cases, scores can be based on one or more of reach, relevance, and impact. For instance influence scores can be calculated from all three of these, while propensity to buy may only be calculated using relevance. When a query 224 is made for users in a given context, the searchable social profile datastore 218 has scores precalculated for hundreds if not thousands of terms that can be used to calculate contextual scores in response to the query 224.

After a first report 226 is provided to the client side, the client side can make an optional query 224 for users. Alternatively, the query 224 can be passed to the API 222 along with the product descriptions, service descriptions, and/or customer data 202. The query 224 can include one or more contexts, where a context describes a combination of one or more terms. The API 222 can take the one or more contexts and search the searchable social profile datastore 218 for all profiles having scores for terms that match the one or more contexts of the query 224, or search for a set of profiles in the queried context having the highest scores. Contextual scores can be generated in response to the query 224 and organized, along with corresponding social profiles, in a report 226 and returned via the API 222 to the client side.

The searchable social profile datastore 218 can also provide data to a system control 250 that passes refresh instructions back to the crawler module 204. The refresh instructions can cause the crawler module 204 to crawl URLs that it may have previously crawled, but where the content and metadata from the last crawl has become stale.

Figure 3:
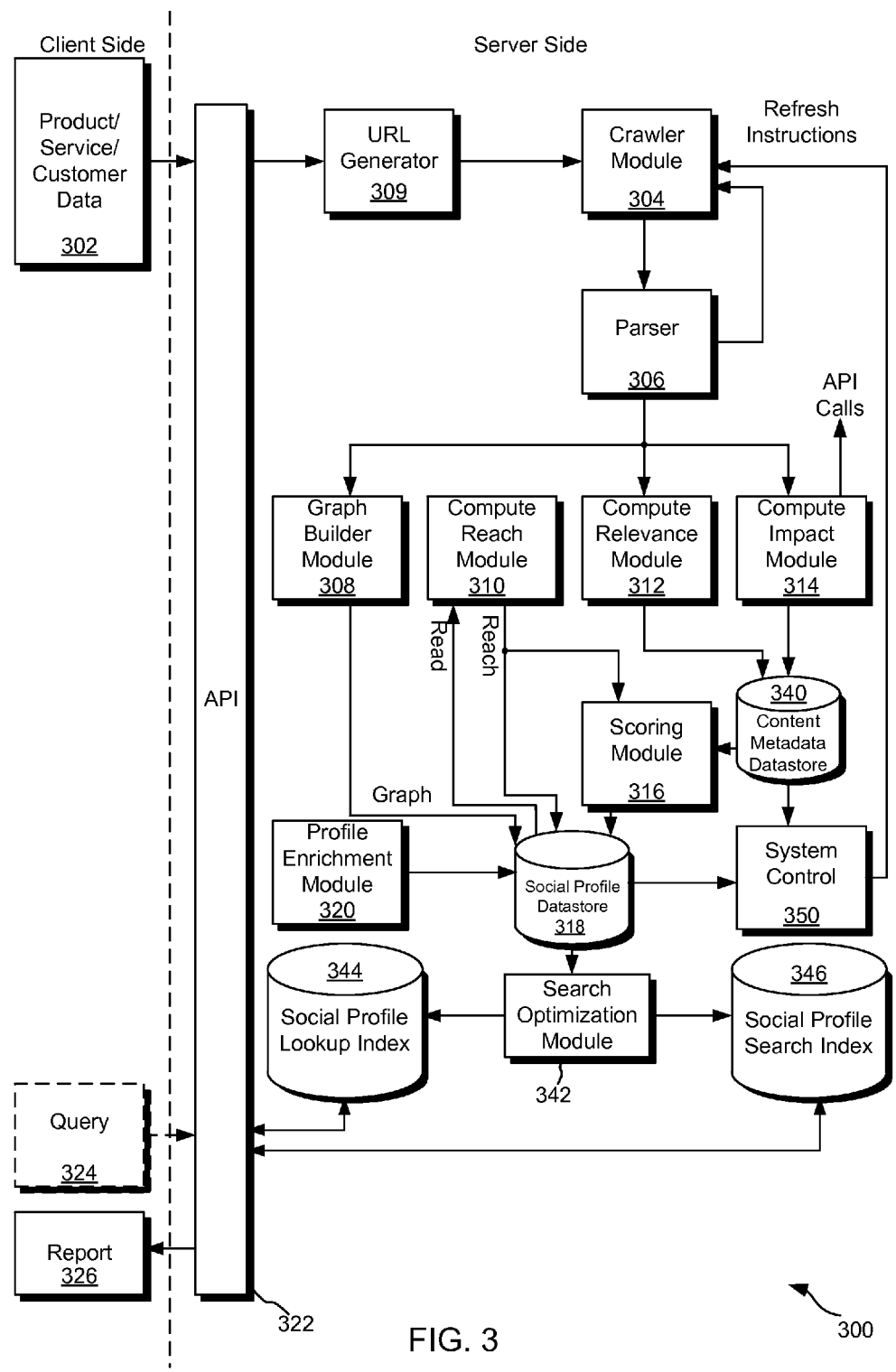
FIG. 3 illustrates yet another system that collects content, associates the content with one or more social profiles and/or creates new profiles, and returns reports showing scores for one or more users in one or more contexts.

FIG. 3 illustrates yet another system that collects content, associates the content with one or more social profiles and/or creates new profiles, and returns reports showing scores for one or more users in one or more contexts. The components and function of system 300 are similar to that discussed in FIG. 2 except that here various components have replaced the searchable social profile database 218, and the system 300 includes a content metadata datastore 340.

The graph datastore, content and other raw data, values, and scores are stored in the social profile datastore 318. A search optimization module 342 prepares social profiles in the social profile datastore 318 for either lookup or search index. In other words the search optimization module 342 organizes and formats the social profiles to make it faster and more accurate to perform lookups of contexts that certain users fit into or searches for users that have high contextual scores. The social profile lookup index 344 comprises an index of contexts that are associated with one or more users. The social profile search index 346 comprises an index of users that are associated with one or more terms and their scores for each term. Therefore, the query 324 can either look for contexts that one or more users fit into, or look for one or more users having high contextual scores for selected contexts. The query 324 calls the API 322, which then interacts with either the social profile lookup index 344 or the social profile search index 346 in order to respond to the query 324.

Here, relevance and impact are stored in the content metadata datastore 340 and are accessed therein by the scoring module 316. The content metadata datastore 340 can also be a repository of content, raw data, relevance values, and impact values. The content and other raw data can be called upon and analyzed for a period of time, but eventually become stale. When this happens, a notice can be passed to the system control 350 that instructs the crawler module 310 to recrawl certain URLs in order to refresh the stale content or raw data. A mapping between the social profile datastore 318 and the content metadata datastore 340 can also be included in the system 300.

Figure 10:
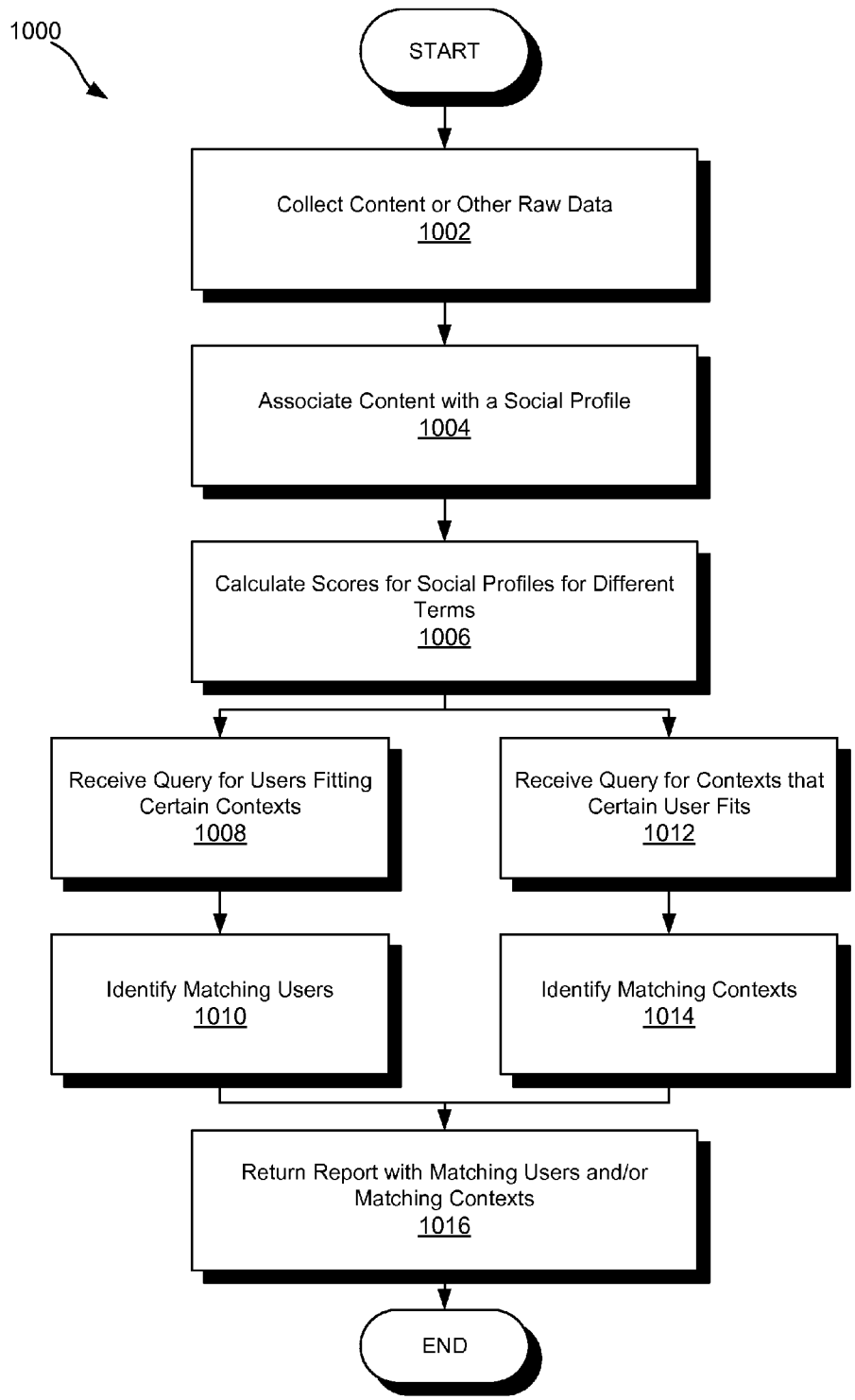
FIG. 10 illustrates a method for generating reports enhancing an understanding of Internet users based on their generated content and actions taken in response to the generated content.

FIG. 10 illustrates a method for generating reports enhancing an understanding of Internet users based on their generated content and actions taken by others in response to the generated content. The method 1000 begins with a collect content or other raw data operation 1002 that collects content or other raw data via a crawler module such as crawler module 104. An associate content with a social profile operation 1004 then associates content with a social profile that can be stored in a searchable social profile datastore 118 or a social profile datastore 318 stored in a memory. The associate operation 1004 can be carried out via a graph builder module such as graph builder module 208. A calculate operation 1006 can then calculate scores for social profiles for different terms, where the terms are parsed from the content or other raw data. The calculate operation can be carried out via a combination of modules such as the analysis module 108 and the scoring module 110 or the compute reach module 210, the compute relevance module 212, the compute impact module 214, and the scoring module 216. Each score can be calculated for a node of a graph datastore and for all terms parsed from content or other raw data associated with the node.

The method 1000 then has two parallel or alternative paths. In the left path a first receive operation 1008 can receive a query for users fitting certain contexts. For instance, the query (e.g., 124) may ask for top influencers fitting a context describing tablet computers. The method 1000 can then identify matching users via a first identify operation 1010, which may be carried out via the combination of an API, such as API 222 and a searchable social profile datastore such as 218. The first identify operation 1010 may also be carried out via a combination of an API, such as 322, and a social profile search index such as 346. The method 1000 may then return a report with matching users in a return operation 1016.

In the right path a second receive operation 1012 that receives a query for contexts that certain users fit. For instance, the query may ask for contexts that are associated with an e-mail address for an existing or potential customer. A second identify matching contexts operation 1014 can then identify contexts that are associated with a social profile matching the user specified in the query. This can be performed via a combination of an API, such as API 322 and a searchable social profile datastore such as 118. The second identify operation 1014 may also be carried out via a combination of an API, such as 322, and a social profile lookup index such as 344. The method 1000 may then return a report with matching contexts in the return operation 1016. The return operation 1016 can also return both matching users and matching contexts if the query calls for both.

Figure 11:
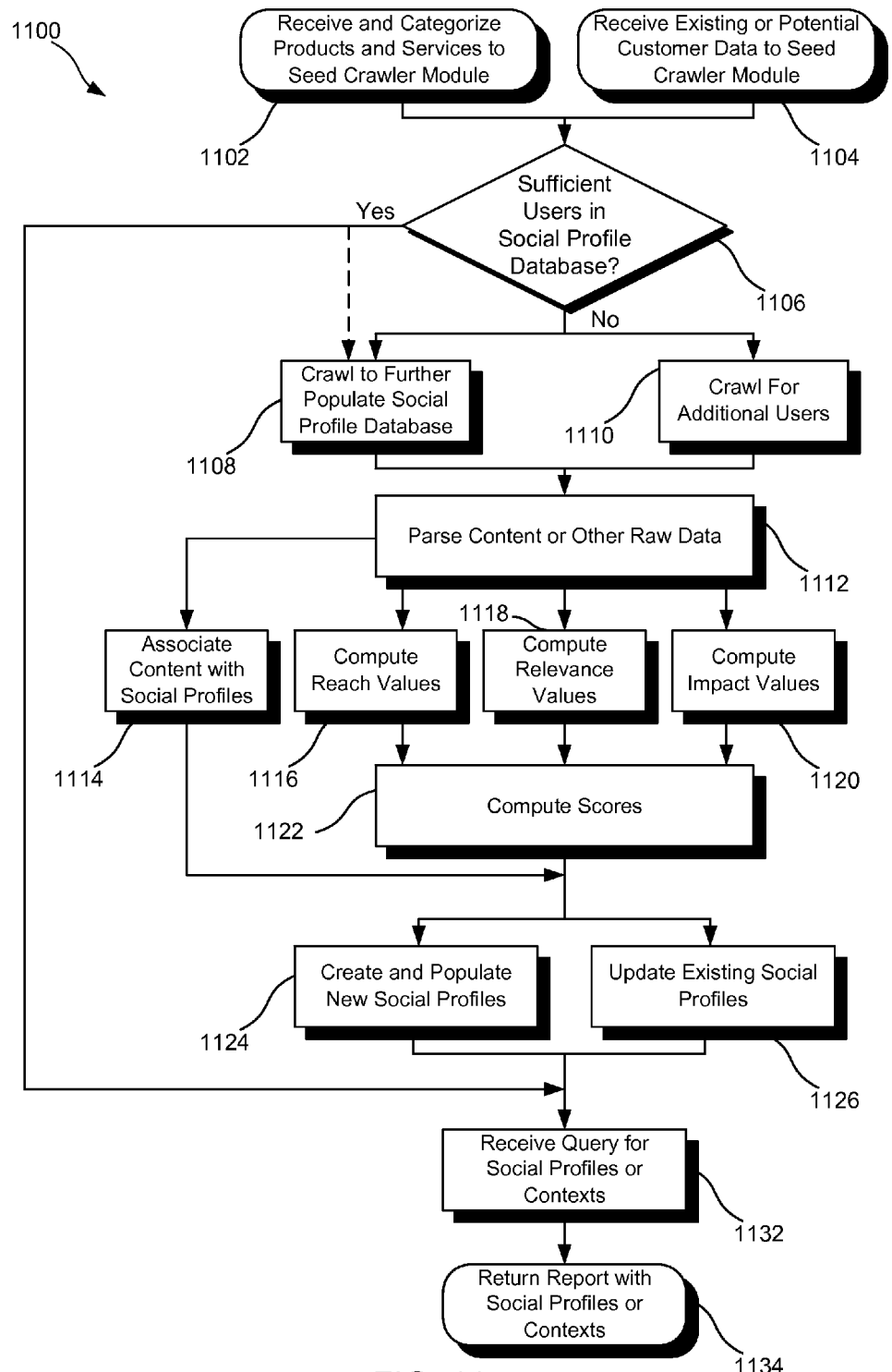
FIG. 11 illustrates another method for generating reports enhancing an understanding of Internet users based on their generated content and actions taken in response to the generated content.

FIG. 11 illustrates another method for generating reports enhancing an understanding of Internet users based on their generated content and actions taken in response to the generated content. The method 1100 can begin with either or both of a first receive operation 1102 or a second receive operation 1104. The first receive operation 1102 receives and categorizes products and services from a client side in order to seed a crawler module. The second receive operation receives existing or potential customer data to seed the crawler module 1104. In some cases, there may be sufficient users in a social profile database as determined by a decision 1106, in which case the method 1100 can immediately turn to returning a report to the client side. As such, the method 1100 can jump to an optional receive query for social profiles or contexts operation 1132 or jump straight to a return report with social profiles or contexts operation 1134. The optional receive query for social profiles or contexts operation 1132 can also follow the return report operation 1134 and can then be followed by another return report operation 1134.

Where the decision 1106 determines that the social profile database does not have sufficient users, the method 1100 can turn to a crawler module to crawl URLs in order to generate new users in crawl operation 1110 and also crawl to further populate existing social profiles in crawl operation 1108. Note, that even where the decision 1106 is affirmative, the method 1100 can optionally also crawl to further populate the social profile database via operation 1108 and all subsequent operations as discussed below. The method 1100 then parses content or other raw data from the crawler module in a parse operation 1112.

The content or other raw data can then be associated with social profiles in an associate content operation 1114. Reach, relevance, and impact values are then calculated via a compute reach values operation 1116, a compute relevance values operation 1118, and a compute impact values operation 1120. A compute scores operation 1122 can then take the reach, relevance, and impact values and compute scores. In one embodiment, scores can be computed for each node in a graph datastore and for each term associated with each node.

Where a social profile does not exist for the content or other raw data, new social profiles can be created and populated via create and populate new social profiles operation 1124. This can include determining an actual name to associate with the social profile, populating the profile with scores and values, and mapping content and other raw data to the profile. Where a social profile does exist it can be updated with the scores, values, and parsed content or raw data via an update existing social profiles operation 1126.

At this point, the method 1100 can execute optional operation 1132 and operation 1134 as discussed above for situations where sufficient users existed in the social profile database according to decision 1106.

Social Marketing Platform

A further aspect of the disclosure describes systems, methods, and apparatus for marketing based on consumer data extracted from at least social media content and Internet content. In particular, initial consumer data can be accessed that includes at least an identifier of a consumer and may include further consumer data such as the date, time, cost, and product of a recent purchase. Using this initial consumer data, and in particular the consumer identifier, additional consumer data can be accessed, for instance by purchasing additional consumer data from a consumer data provider or by extracting additional consumer data from social media (e.g., FACEBOOK profiles, TWITTER TWEETS, product reviews, to name a few) and various other sources of Internet content.

To make the combination of initial and additional consumer data more manageable (the combination will be referred to as consumer data), a subset of the combined consumer data can be selected as data most relevant to identifying consumers likely to make another purchase and/or influence others to make a purchase. The subset of consumer data can be evaluated to generate derived fields such as in-market status and influence on other consumers. The subset of consumer data and the derived fields, can periodically be updated, for instance via a nightly evaluation to update the derived fields. The subset of consumer data and the derived fields either alone or in combination, can also be analyzed in a segmentation operation that places the consumers into segments. The segments can be used to recommend marketing strategies to clients or to suggest groups of consumers that are best suited to receive further marketing content.

Figure 12:
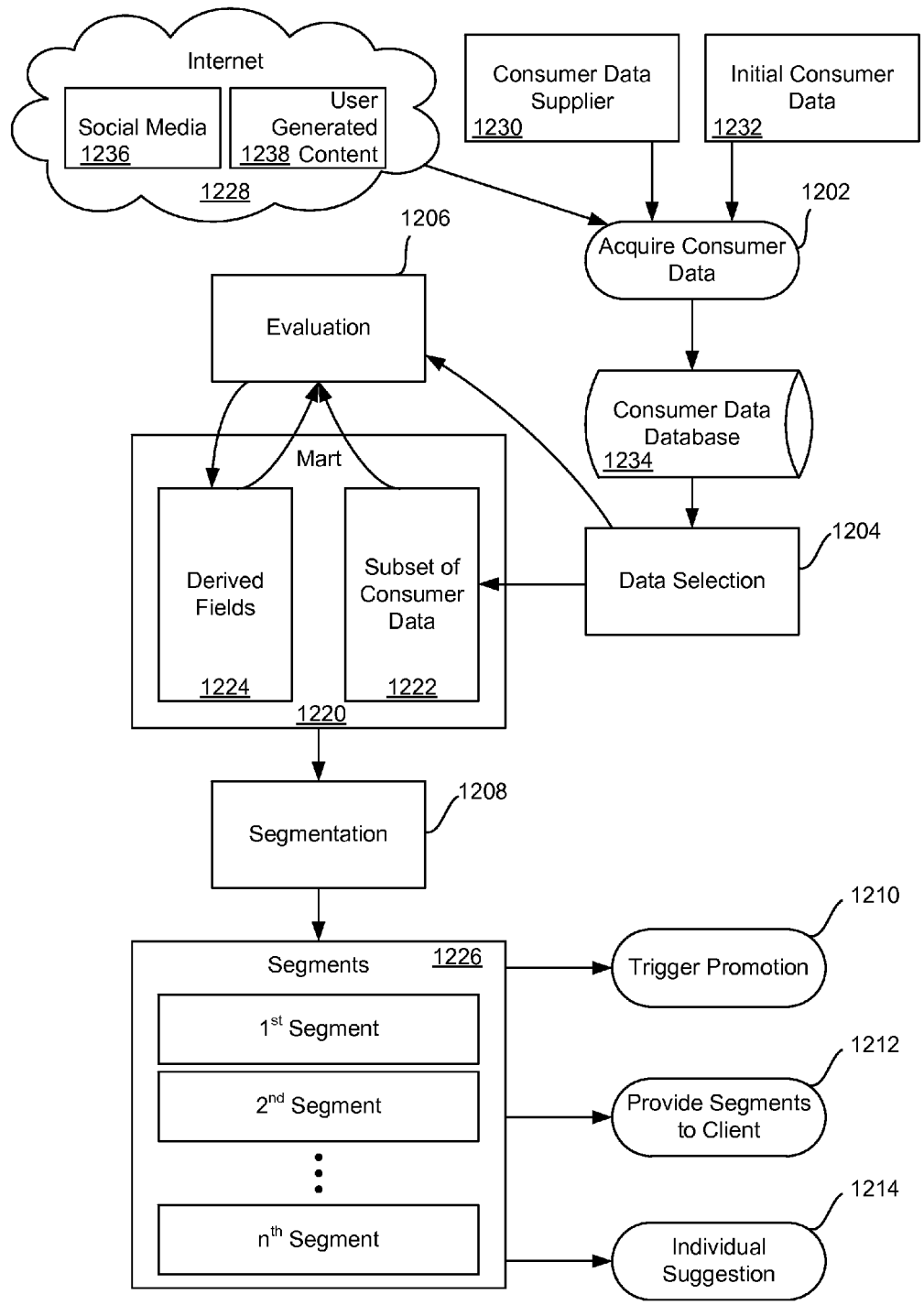
FIG. 12 illustrates one arrangement of logical components and functions for marketing based on at least social media content.

FIG. 12 illustrates one arrangement of logical components and functions for marketing based on social media content and other Internet content. Initially, consumer data can be acquired in acquire consumer data operation 1202. A subset of the consumer data 1222 can be selected in the data selection operation 1204 and passed to a mart 1220 or to an evaluation operation 1206. Either way, the evaluation operation 1206 takes the subset of consumer data 1222 and generates one or more derived fields 1224 that can be added to or used to update existing derived fields 1224. Segmentation 1208 can then use the derived fields 1224 and/or the subset of consumer data 1222 to place consumers into segments 1226. The segments 1226 can be used to trigger promotions or other marketing methods in a trigger operation 1210. The segments 1226 can be provided to marketing clients in a provide operation 1212 so that the marketing clients can use the segments to develop or modify their marketing strategies. The segments 1226 can also be used to make individual consumer suggestions in individual suggestion operation 1214 so that one or more clients can tailor marketing strategies to individual consumers.

Acquiring Consumer Data

The acquire consumer data operation 1202 can first include acquiring identifying information regarding one or more consumers. The identifying information (e.g., e-mail address, phone numbers, mailing address) can be part of initial consumer data 1232 that also can include, for instance, purchase history, demographics, and consumer affinity. The identifying information can be used to acquire additional consumer data, for instance via purchase from a consumer data supplier 1230 or via extraction from the Internet 1228.

The initial consumer data 1232 can include an e-mail address or other identifying information for one or more consumers and purchase attributes for each of the one or more consumers. Other examples of consumer data include, but are not limited to, demographics, behavior on social networks, consumer affinity, recency of a purchase, purchase frequency, and monetary attributes of those purchases. These attributes may also be characterized in relation to a given company, product line, organization, or other entity. The initial consumer data can describe one or a plurality of consumers. The initial consumer data may be provided by a client. For instance, the initial consumer data may have been acquired by a client as the result of making prior sales to a number of customers. Thus, the client provides the initial customer data as part of a request for suggested consumers best suited for marketing.

In one embodiment, the identifying information for one or more consumers can be provided to a consumer data supplier 1230 who then associates additional consumer data with the consumers identified by the identifying information and provides this additional consumer data in exchange for consideration (e.g., money).

In another embodiment, the identifying information for one or more consumers can be used to extract the additional information from the Internet 1228. For instance, an e-mail address, residential address, telephone number, or some other identifying information can be used to identify social media 1236 content or social media 1236 profiles. Additional consumer data, such as gender, hometown, and age, can be extracted from the social media 1236 content of the social media 1236 profiles.

Social media 1236 content can include TWITTER TWEETS and FACEBOOK updates and wall posts, to name a few non-limiting examples. As one example, a TWITTER user may TWEET, "Today, just bought Canon 24-105 mm f/4 L-series lens." The text of the TWEET can be extracted, stored, and processed as consumer data, and additional consumer data can be extracted from the TWEET. For instance, a consumer data field for presence on social networks may be filled with a positive value, and/or with another value indicative of the consumer's presence on TWITTER. A consumer behavior field may be populated with the brand of the purchase, "Canon."

Social media 1236 profiles can include, for example, a user profile page on FACEBOOK, TWITTER, or LinkedIn. Such profiles often contain consumer data such as gender, residential address, alternative names, employers, age, e-mail addresses, and/or links to personal websites.

The additional consumer data can be acquired from both the consumer data supplier 1230 and the Internet 1228. In some cases, additional consumer data on certain consumers will only be available from the consumer data supplier 1230, while others will only be available from the Internet 1228. Thus, these two sources can be used to supplement gaps in each other. For instance, a consumer data supplier 1230 may provide gender for one or more consumers, but the gender of a few consumers may be unknown. The acquire consumer data operation 1202 can look to social media content 1236 on the Internet 1228, such as TWITTER account profiles or LinkedIn account profiles, to fill in the gaps. In another example, a consumer data supplier 1230 may provide consumer affinity based on analysis of consumer credit card histories, but there may be gaps for certain consumers where the credit card histories did not provide sufficient detail. Additional consumer data extracted from the Internet 1228 can supplement the data supplied by the consumer data supplier 1230 and can potentially fill in the gaps in that set of data.

Consumer data can be acquired via a number of different means. In an embodiment, purchase histories can be gleaned from data on credit card usage. Consumer affinity for a brand can be extracted from the text of reviews that a consumer posts on social media and retail websites. Behavior on social networks can be extracted from a consumer's public actions such as 'liking' a product on FACEBOOK. These are just a few non-limiting examples of how and where consumer data can be extracted.

The initial consumer data and the additional consumer data can pass to a consumer data database 1234 for temporary or long-term storage. The database 1234 can take the form of a database written to and accessed on memory (e.g., RAM, cache, SDD, HDD) of one or more computing devices (e.g., one or more remote servers). However, the database 1234 can also merely represent a logical state of the consumer data en route to the data selection operation 1204, and thus does not have to be written to memory. In one embodiment, the acquire operation 1202 and the data selection operation 1204 can operate in succession such that consumer data is not written to a memory between the two operations.

The consumer data can also be cleansed before reaching the consumer data database 1234, which means transforming the consumer data into standardized formats to ease comparison. For instance, addresses may be standardized in accordance with US Postal Service standards, or multiple records may be synthesized into a single contact, household or residence. Consumer age and gender can be standardized by converting these attributes into ranges (e.g., 20-29, 30-39, and 40-41).

Data Selection

The data selection operation 1204 then selects a subset of the consumer data so that the evaluation operation 1206 can operate on a smaller and more organized set of data. This means selecting either the best data or the best source of data. By best data it is meant that given multiple data values for a given field, the value most able to assist in segmenting consumers into different segments 1226 is the best data value. By best data source it is meant that given multiple sources of consumer data, one of those sources provides data that is considered most relevant in assisting the segmentation operation 1208. For example, a data value extracted from a blog post may be selected over one provided in a comment to a blog since the blog post is considered the better source (e.g., more reliable or more accurate).

In one embodiment, this means filtering based on criteria intended to filter out data that is less relevant or useful. In another embodiment, the data selection operation 1204 can include a hierarchy of rules to select the subset of consumer data 1222. The hierarchy of rules steps through each rule eliminating data that meets (or fails) each rule. For instance, a first rule can ask whether any of the data sources are public records. If so, then the data value from the public record (or one of the public records) is selected over all others. If there is no public record source, then the hierarchy moves on to a second rule, and so on. If data for a given field has been reduced to a single value or a single source, then the hierarchy of rules is complete and the data selection operation 1204 can move on to a next field. In another embodiment, a mode or most common value for a data field can be selected. For example, FACEBOOK and TWITTER may both indicate that a consumer is 32 years old, while LinkedIn indicates his/her age at 33. Since the most common value for the age is 32, the data from FACEBOOK and TWITTER can be used rather than that from LinkedIn. In another embodiment, an average or weighted average of values from different sources can be used. For instance, TWITTER may be considered more reliable than FACEBOOK, and therefore when values from FACEBOOK and TWITTER are averaged, a slightly greater weight may be given to the TWITTER value.

Beyond mere selection of data, the data selection operation 1204 may also involve transformation of some or all of the consumer data. Transformation may mean extracting or isolating text or values from content, such as extracting a brand-name from a TWEET. For instance, the original consumer data may be a FACEBOOK update such as "Loving my new MacAir," yet the data extracted from this may be the brand name "Mac" or "Apple." In another example transformation may involve extracting data from a photograph, video, or audio file. For instance, facial recognition of a photograph or video can indicate the names of people who a consumer associates with and who the consumer may be more likely to influence to make purchases.

Transformation may also include changing a format of the consumer data into a format that is more uniform across the subset of consumer data 1222. For instance, dates (e.g., birthdates and dates of purchases or dates of TWEETS) come in a variety of formats, and thus transformation may include converting all dates into a common format, such as <month, day, year>. As another example, given transactional data that includes purchases made by consumers, transformation may include summarizing this transaction data with a single total purchases value. In another example, transaction data can be summarized in a value representing a customer's lifetime value. As seen, the data selection operation 1204 not only generates a subset of the consumer data 1222 that is smaller and thus more easily analyzed than the original consumer data, but the subset 1222 is also organized in a fashion that eases analysis and speeds the evaluation operation 1206.

The data selection operation 1204 can also include extract, transform, and load suboperations. Extraction involves selecting data from one or more sources and extracting it into a memory. Transformation involves transforming the data into forms that are more easily compared such as ranges of data. Data can then be loaded into the Mart 1220 in the load suboperation.

In some embodiments, the consumer data and the subset of consumer data 1222 can be stored or written to a memory 12, such that the data selection operation 1204 can again operate on the consumer data at a later time, or when new consumer data arises.

The subset of consumer data 1222 can be provided to the mart 1220 or to the evaluation operation 1206 or to both. The subset of consumer data 1222 can be a flat set of data, meaning that values or variables in the subset 1222 are one-dimensional.

Evaluation

The evaluation operation 1206 can be performed on the subset of consumer data 1222 before or after the subset 1222 is provided to or stored in the mart 1220. The evaluation operation 1206 analyzes the subset of consumer data 1222 and generates or updates derived fields 1224. The derived fields 1224 can be added to or can be used to update existing fields 1224 in the mart 1220. For instance, the evaluation operation 1206 can be performed on a nightly basis, thus nightly generating and updating the derived fields 1224. The evaluation operation 1206 can also assign scores to each consumer for each of one or more derived fields 1224. More details of the evaluation operation 1206 will be discussed in conjunction with the below description of the derived fields 1224.

Segmentation

Segmentation 1208 is a process of analyzing the derived fields 1224, and optionally also the subset of consumer data 1222, in order to place consumers into segments 1226, where the segments 1226 can be used to aid clients in selecting consumers for marketing and for selecting means of marketing. Consumers can be placed into one or more segments 1226 based on scores assigned to them for each of one or more derived fields 1224. For instance, where a client desires a segment 1226 of the most influential consumers, the segment 1226 may be filled with all consumers having a score of 5 (out of 5) in the derived field of influence.

One or more segments 1226 and lists or tables of consumers that are assigned to each segment 1226 can be provided to clients. In one case this can be in response to a client request for either suggested segments 1226 or for segments 1226 selected by the client (e.g., segment of most influential consumers). As the derived fields 1224 and the subset of consumer data 1222 are updated, consumers can be moved in and out of the segments 1226—in other words, the segments 1226 can also be updated.

The segments 1226 that exist or that are provided to a client can be automatically selected or can be selected by a client inquiry. A client inquiry can include desired segments 1226 or a description of a desired type of customer where the description can be represented by one or more segments 1226.

Segments can include, but are not limited to, categories related to in/out of market status, demographics (e.g., age, gender, household income), psychographics (e.g., attributes relating to personality, values, attitudes, interests, lifestyles), or behavioral attributes (e.g., recency, frequency, monetary dimension, loyalty).

Once consumers are placed in segments 1226, the segments 1226 can be used to automatically trigger a promotion or other marketing material in trigger promotion operation 1210. The characteristics of the automated promotion can be predefined by a client. Triggering can result from one or more consumers being added to or removed from a segment. The promotion may be sent via a variety of means including, but not limited to, e-mail, mobile message (e.g., SMS), smartphone or tablet computer app, online display advertising, direct mail (e.g., 'snail mail'), telemarketing, or a point of sale means.

The segments 1226 can also be used to generate individual marketing suggestions for each consumer in an individual suggestion operation 1214 (e.g., consumer X is in-market and is looking for ping pong equipment). Suggestions can include who the marketing should be aimed at, what type of marketing should be used, and when and where the marketing should be displayed or presented. Alternatively, a provide segments to client operation 1212 can provide one or more segments 1226 to a client based on a description of the client's preferred consumers.

Consumer Data

Consumer data includes any data that can be used to assist in assigning consumers to segments 1226. A few non-limiting categories or fields of consumer data include social network identifiers, presence on social networks, behavior on social networks, content on social networks, contact data, demographics, consumer behavior, consumer affinity, remote system IDs, aggregated customer performance, and detailed transactional data.

The field of social network identifiers can include values indicating different social networks or means to access or link to social networks. For instance one identifier is a TWITTER handle while a FACEBOOK User ID is another identifier.

The field of presence on social networks (or other types of websites) can include binary values indicating whether a consumer has any presence on any social network. The values may also indicate which social networks the consumer has a presence on.

The field of behavior on social networks (or other types of websites) can be populated with values indicating a consumer's behavior such as time, date, and/or type of activity. Tweeting on TWITTER, updating status on FACEBOOK, and liking a product or brand on FACEBOOK are three exemplary types of activity that can be described as consumer data in the field of behavior on social networks.

The field of content on social networks (or other types of websites) can include any user-generated content such as videos (e.g., FACEBOOK or YOUTUBE videos), photos, status updates, TWEETS, product reviews, blog posts, comments on blogs and articles, shared links, and other content expressing affinity for a brand, company, service, or product (e.g., 'liking' a company, brand, or service on FACEBOOK).

The field of contact data can include any data useful for establishing communication with a consumer such as an e-mail address, residential address, phone number, URL, or IP address, to name a few.

Some non-limiting examples of data in the demographic field include age, gender, household income, education level, race, political affiliation, and marital status, to name a few.

Data in the consumer behavior field describes consumer behavior and actions outside the social media context. For instance, behaviors such as purchases and purchases in a particular product category can all be consumer data in the field of consumer behavior. More particularly, consumer behavior may indicate that a consumer predominately shops on AMAZON or most frequently purchases CANON and NIKON branded products.

The field of consumer affinity describes consumer preference for certain products, brands, and other categories of product. For instance, consumer affinity may comprise one or more indicators of a consumer's affinity for CANON or photography products or even a preference for 'fast' camera lenses versus slow camera lenses. Consumer affinity may also describe categories of lifestyle that a consumer fits into such as skier, dancer, shooter, gamer, outdoorsman, organic, conservative, adventurous, and placid, to name just a few non-limiting examples of the plethora of lifestyles and types of lifestyles that consumer affinity may describe.

The field of remote system IDs can include Customer Relationship Management (CRM), e-mail service provider, or content management, to name a few. These IDs may be derived or extracted from other marketing systems such as those of the consumer data provider 1230.

Also, the field of aggregated customer performance information can include values representative of a monetary value of purchases or a number of purchases made over a period of time, to name two examples. Detailed transaction data can include, for instance, purchases, returns, and credits from an electric commerce (e-commerce) or retail point of sale system.

Consumer data can often be extracted from user-generated Internet content 1228 such as TWEETS, FACEBOOK updates and FACEBOOK Interests, comments on blogs, and product reviews, to name a few. For instance, a consumer may TWEET the following: "Today, just bought Canon 24-105 mm f/4 L-series lens . . . dig Canon . . . now for a macro lens." Text from the TWEET can be extracted, stored, and processed as consumer data. Various fields can be extracted from this TWEET such as presence on social networks, behavior on social networks, and consumer affinity. A consumer data field for presence on social networks may be filled with a positive value, and/or with a value representing TWITTER. Another consumer data field representing behavior on social networks can be populated with a positive value, and/or can include an indicator that the consumer engaged in a TWEET action and may include indicators of the time and date of the TWEET. Consumer behavior can be extracted as a data point indicating the purchase of a CANON product or specifically the brand and model. The consumer affinity field could here be populated with an indicator of photography equipment for digital single lens reflex (DSLR) cameras or for high-end or professional-level equipment.

Subset of Consumer Data

The subset of consumer data 1222 comprises some or all of the consumer data that was stored in or passed through the consumer data database 1234, and in particular is that selected by the data selection operation 1204. The subset 1222 may include a smaller number of data points than the original set of consumer data as well as a more organized and more uniformly formatted set of consumer data. The evaluation operation 1206 can access some or all contents of the subset of consumer data 1222. The subset of consumer data 1222 can be stored or written to the mart 1220.

The subset of consumer data 1222 can be updated, for instance on a periodic basis. Updating can involve storing new consumer data or new fields, or replacing existing consumer data. For instance, where new sources provide a more accurate estimate of a consumer's household income, the household income field in the subset of consumer data 1222 may be updated.

Derived Fields

Each consumer can be associated with derived fields 1224 that are generated and updated via the evaluation operation 1206. Derived fields include data that has gone through analysis and transformation beyond mere selection of a best data value as carried out by the data selection operation 1204. For instance, some non-limiting examples of derived fields include influence, breadth of digital footprint, reach, recency, frequency, in-market status, depth of consumer-to-consumer relationships, and consumer value to a client. Derived fields are used to ascertain actionable insight about a given consumer.

Derived fields 1224 can be multidimensional data sets. A consumer's overall value to a client, can be based upon a multidimensional score where each dimension is represented by a score for a given derived field. Different clients may desire different types of consumers, and thus each client can indicate which dimensions are favored when evaluating a set of consumers.

Each derived field for each consumer can be associated with a score as determined in the evaluation operation 1206. For instance, in the field of influence, ten consumers may be assigned a score of 3 out of 5, two may be assigned scores of 4 out of 5, and one may be assigned a score of 5 out of 5.

Influence can include a consumer's propensity to influence other consumers to achieve a particular behavior (e.g., causing another consumer to make a purchase). For instance, a consumer may TWEET "Just bought Canon 24-105 mm f/4 L-series lens . . . dig Canon . . . now for a macro lens." The evaluation operation 1206 can track consumers that are associated with this user and determine how many of those other consumers made similar purchases within a reasonable time of this TWEET. Where a substantial number of related consumers purchase CANON camera products within a month of this TWEET, the consumer's influence score may be high. Where no related consumers make a CANON purchase within a month of this TWEET, the consumer's influence score may be low.

Influence can include data describing one or more of the following: number of networks on which the consumers can be confirmed; number of consumers connected to the given consumer on each network; volume of updates by the consumer on each network; content, interaction type, and timestamp of updates for each network; volume of interactions by the consumer's connections with said consumer's updates on each network; content, interaction type, and timestamp of interactions for each network made by the consumer's connections on each network; and frequency of interactions by consumer's connections.

Influence can be derived from quantitative and/or qualitative aspects of content (e.g., social media content). For instance, influence may be derived from a number of TWEETS, but also from content in TWEETS indicating that a user's friends respond positively to the user's product recommendations. In one embodiment, influence can include or be derived from at least three components. The first component can comprise topical terms associated with an organization or company's products, product categories, services, service categories, context of product use, or other topics of inters. The second component can include a sentiment that establishes parameters for positive, negative, or neutral feelings toward the topical objects. The third component can be an intention that represents how likely content suggests that a purchasing decision is imminent.

Reach can include a reach of a consumer's influence. In particular, reach can include data describing a number of networks on which the consumer can be confirmed and a number of consumers connected to the consumer on each network.

Recency can include one or more indicators of a time of consumer behavior (e.g., time since last purchase or time since last TWEET). In particular, recency can include data describing one or more of the following: volume of updates by the consumer for each network; content, interaction type, and timestamp of updates on each network; volume of interactions by the consumer's connections with said consumer's updates on each network; content, interaction type, and timestamps of interactions for each network made by the consumer's connections on each network; and frequency of interactions by the consumer's connections.

Frequency can include an indicator describing the number of behaviors or actions in a given time that a consumer engages in (e.g., number of monthly Amazon purchases or percentage of purchases for which the consumer creates an online customer review for the product). Particularly, frequency can include data describing one or more of the following: volume of updates by the consumer on each network; content, interaction type, and timestamp of updates on each network; volume of interactions by the consumer's connections with said consumer's updates on each network; content, interaction type, and timestamp of interactions for each network made by the consumer's connections on each network; and frequency of interactions by the consumer's connections.

Footprint can include an indicator describing the number of networks on which a consumer has account activity. Account activity can be detected or inferred. Inferred activity can be based on demographics and behavior. Footprint can include data describing one or more of the following: number of networks on which the consumer can be confirmed; consumer demographic attributes including age, gender, household income, employer, occupation and location of primary residence.

In-market status can describe a consumer's likelihood of purchasing a specific product or purchasing from a specific product category, and can include a likelihood as a function of time (e.g., in-market status for the next 2 days versus for the next month). Returning to the CANON lens TWEET example above, the TWEET includes the language "now for a macro lens," which may indicate that the consumer is in the market for another lens. In contrast, if the consumer posted the following text, "Ford GT now in the garage . . . No need to buy another car ever!," it might be interpreted as indicating little to no interest in making a further purchase thus resulting in a lower in-market score. Breadth, depth, recency, and frequency can also be related to these characteristics on social networks (e.g., recency of consumer behavior on social networks).

In-market status can include data describing the following: volume of updates by the consumer for each network; content, interaction type, and timestamp of updates for each network; volume of interactions by the consumer's connections with the consumer's updates on each network; content, interaction type, and timestamp of interactions for each network made by the consumer's connections on each network.

Each of these derived fields 1224 can also constitute a dimension of derived fields 1224 associated with a consumer such that each consumer can be represented by a multidimensional field or vector. Furthermore, each derived field 1224, or dimension of the multidimensional field or vector, can have a weight, such that some fields or dimensions have a greater influence on what segment 1226 a consumer is placed into than others. For instance, influence can be weighted more heavily than reach. Alternatively, different social media or Internet sources can have different weights (e.g., FACEBOOK would likely be more heavily weighted than MYSPACE in 2012).

Derived fields 1224 can each include a score, quantifying the field as it relates to each consumer. These scores can be based on comparison of consumers. For instance, a consumer having greater influence than another consumer can have a higher influence score. To compare consumers, indexes can be assigned to each consumer in each of one or more derived fields 1224, and a score can be derived from the index that indicates a consumer's value in a field relative to other consumers. For instance, a first consumer may have an index for influence of 52 while a second consumer has an index of 98.

Based on these scores, the second consumer would be assigned a higher score for influence than the first consumer.

In an embodiment, a baseline index is set for all consumers. Each consumer receives an index, which can be used to determine a distribution of consumers relative to the baseline. The distribution can include one or more breaks separating regions of the distribution in which consumers are assigned the same score. For instance, indexes may range from 0 to 100 (a baseline of 50), with each 20 points in index corresponding to a different score (e.g., index range=score: 0-20=1, 21-40=2, 41-60 =3, 61-80=4, 81-100=5). The method of determining indexes can be such that the majority of consumers receive a score of 2, 3, or 4, while only a handful of scores of 1 or 5 are assigned. In other embodiments, the ranges of indexes can be unequal (e.g., index range=score: 0-10=1, 11-30=2, 31-70=3, 61-80=4, 81-100=5). While derived fields 1224 do not need to be assigned scores, assigned scores can make the segmentation 1208 faster, less complex, and more consistent.

Scores can represent a value of a consumer in a given derived field 1224. For instance, in the field of in-market status, there may be five scores (1-5). A 0 may be assigned where not enough information exists to determining the likelihood of being in-market. A score of 1 may be assigned to those consumers least likely to be in-market, a 2 to those somewhat likely to be in-market. A 3 can be assigned to those moderately likely to be in-market. Scores of 4 and 5 are assigned to consumers who are more likely to be in-market and most likely to be in-market, respectively. These are just a few examples scores and their meaning.

In an embodiment, an index can be derived based on a number of subscores or data. For instance, an index for in-market status can be assigned based on factors such as the volume of updates by the consumer in each network and the volume of interactions by the consumer's connections with the consumer's updates on each network. Each factor considered in determining an index can have a weight, where the weight determines a factor's importance in assigning an index.

The Mart

The mart 1220 can include the subset of consumer data 1222 and the derived fields 1224. It may consist of a memory residing on a computing device or distributed among two or more computing devices (e.g., remote servers). The subset of consumer data 1222 and the derived fields 1224 can be stored in or written to the mart 1220 or can logically reside within the mart 1220.

Figure 13:
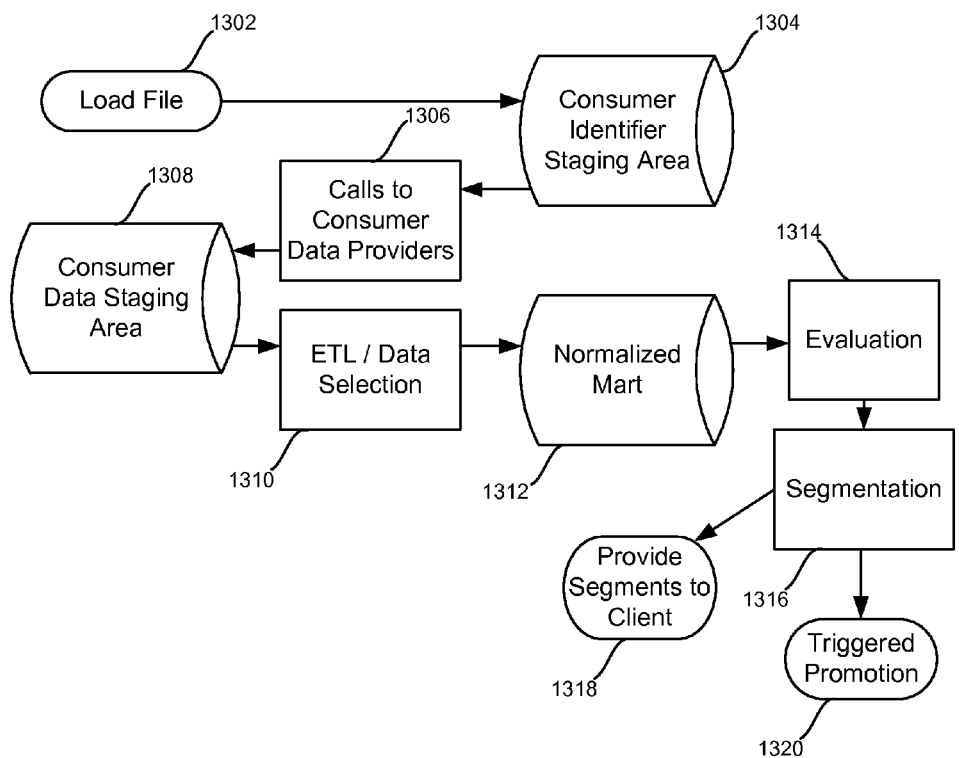
FIG. 13 illustrates another arrangement of logical components and functions for marketing based on at least social media content.

FIG. 13 illustrates another arrangement of logical components and functions for marketing based on social media content and other Internet content. In this embodiment a load file operation 1302 loads a file to a computing system, where the file includes at least a consumer identifier (e.g., e-mail address, telephone number, residential mailing address). The consumer identifier is provided to a consumer identifier staging area 1304 where the consumer identifier can be formatted to ease readability and can be access for further processing. Calls 1306 are then made to consumer data providers who return consumer data that is associated with the consumer identified by the consumer identifier. This additional consumer data can be passed to a consumer data staging area 1308, where the data is prepared for further analysis, integration, and organization.

An extract, transform, and load operation 1310 (or data selection) then extracts the consumer data from the consumer data staging area 1308, transforms those portions of the data that need transforming into a form that is more easily analyzed and organized, and loads this transformed consumer data into a normalized mart 1312. The normalized mart 1312 includes a subset of the consumer data where the subset comprises data of common forms that are easily compared, searched, and analyzed.

Evaluation 1314 can then be performed on the subset of consumer data in the normalized mart 1312 to generate derived fields. The derived fields can be stored or written to the normalized mart 1312 and/or updated within the normalized mart 1312. The derived fields and optionally the subset of consumer data can then pass through a segmentation operation 1316 where the consumers associated with the consumer data are assigned segments (e.g., influence, in-market status, recency, frequency, etc.). The segments can then be passed to a client in a provide operation 1318 or can trigger a promotion 1320 where the promotion and the triggering mechanisms can be selected by a client.

Figure 14:
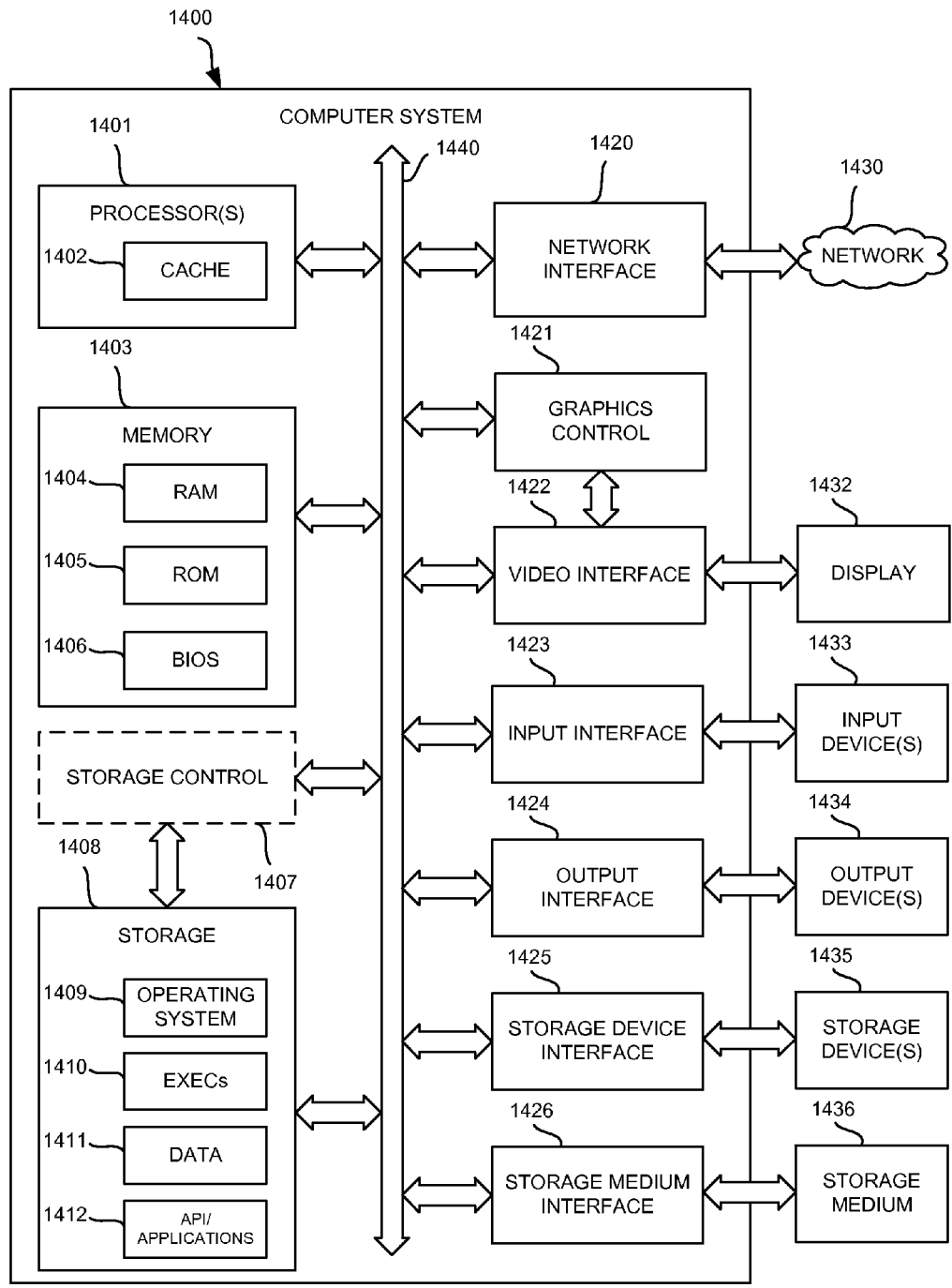
FIG. 14 illustrates a computing system configured to carry out the methods and to interact with the systems and apparatus described in this disclosure.

The systems and methods described herein can be implemented in a machine such as a computer system in addition to the specific physical devices described herein. FIG. 14 shows a diagrammatic representation of one embodiment of a machine in the exemplary form of a computer system 1400 within which a set of instructions can execute for causing a device to perform or execute any one or more of the aspects and/or methodologies of the present disclosure. The components in FIG. 14 are examples only and do not limit the scope of use or functionality of any hardware, software, embedded logic component, or a combination of two or more such components implementing particular embodiments.

Computer system 1400 may include a processor 1401, a memory 1403, and a storage 1408 that communicate with each other, and with other components, via a bus 1440. The bus 1440 may also link a display 1432, one or more input devices 1433 (which may, for example, include a keypad, a keyboard, a mouse, a stylus, etc.), one or more output devices 1434, one or more storage devices 1435, and various tangible storage media 1436. All of these elements may interface directly or via one or more interfaces or adaptors to the bus 1440. For instance, the various tangible storage media 1436 can interface with the bus 1440 via storage medium interface 1426. Computer system 1400 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 1401 (or central processing unit(s) (CPU(s))) optionally contains a cache memory unit 1402 for temporary local storage of instructions, data, or computer addresses. Processor(s) 1401 are configured to assist in execution of computer readable instructions. Computer system 1400 may provide functionality as a result of the processor(s) 1401 executing software embodied in one or more tangible computer-readable storage media, such as memory 1403, storage 1408, storage devices 1435, and/or storage medium 1436. The computer-readable media may store software that implements particular embodiments, and processor(s) 1401 may execute the software. Memory 1403 may read the software from one or more other computer-readable media (such as mass storage device(s) 1435, 1436) or from one or more other sources through a suitable interface, such as network interface 1420. The software may cause processor(s) 1401 to carry out one or more processes or one or more steps of one or more processes described or illustrated herein. Carrying out such processes or steps may include defining data structures stored in memory 1403 and modifying the data structures as directed by the software.

The memory 1403 may include various components (e.g., machine readable media) including, but not limited to, a random access memory component (e.g., RAM 1404) (e.g., a static RAM "SRAM", a dynamic RAM "DRAM", etc.), a read-only component (e.g., ROM 1405), and any combinations thereof. ROM 1405 may act to communicate data and instructions unidirectionally to processor(s) 1401, and RAM 1404 may act to communicate data and instructions bidirectionally with processor(s) 1401. ROM 1405 and RAM 1404 may include any suitable tangible computer-readable media described below. In one example, a basic input/output system 1406 (BIOS), including basic routines that help to transfer information between elements within computer system 1400, such as during start-up, may be stored in the memory 1403.

Fixed storage 1408 is connected bidirectionally to processor(s) 1401, optionally through storage control unit 1407. Fixed storage 1408 provides additional data storage capacity and may also include any suitable tangible computer-readable media described herein. Storage 1408 may be used to store operating system 1409, EXECs 1410 (executables), data 1411, API applications 1412 (application programs), and the like. Often, although not always, storage 1408 is a secondary storage medium (such as a hard disk) that is slower than primary storage (e.g., memory 1403). Storage 1408 can also include an optical disk drive, a solid-state memory device (e.g., flash-based systems), or a combination of any of the above. Information in storage 1408 may, in appropriate cases, be incorporated as virtual memory in memory 1403.

In one example, storage device(s) 1435 may be removably interfaced with computer system 1400 (e.g., via an external port connector (not shown)) via a storage device interface 1425. Particularly, storage device(s) 1435 and an associated machine-readable medium may provide nonvolatile and/or volatile storage of machine-readable instructions, data structures, program modules, and/or other data for the computer system 1400. In one example, software may reside, completely or partially, within a machine-readable medium on storage device(s) 1435. In another example, software may reside, completely or partially, within processor(s) 1401.

Bus 1440 connects a wide variety of subsystems. Herein, reference to a bus may encompass one or more digital signal lines serving a common function, where appropriate. Bus 1440 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 1400 may also include an input device 1433. In one example, a user of computer system 1400 may enter commands and/or other information into computer system 1400 via input device(s) 1433. Examples of an input device(s) 1433 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 1433 may be interfaced to bus 1440 via any of a variety of input interfaces 1423 (e.g., input interface 1423) including, but not limited to, serial, parallel, game port, USB, FIREWIRE, THUNDERBOLT, or any combination of the above.

In particular embodiments, when computer system 1400 is connected to network 1430, computer system 1400 may communicate with other devices, specifically mobile devices and enterprise systems, connected to network 1430. Communications to and from computer system 1400 may be sent through network interface 1420. For example, network interface 1420 may receive incoming communications (such as requests or responses from other devices) in the form of one or more packets (such as Internet Protocol (IP) packets) from network 1430, and computer system 1400 may store the incoming communications in memory 1403 for processing. Computer system 1400 may similarly store outgoing communications (such as requests or responses to other devices) in the form of one or more packets in memory 1403 and communicated to network 1430 from network interface 1420. Processor(s) 1401 may access these communication packets stored in memory 1403 for processing.

Examples of the network interface 1420 include, but are not limited to, a network interface card, a modem, and any combination thereof. Examples of a network 1430 or network segment 1430 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 1430, may employ a wired and/or a wireless mode of communication. In general, any network topology may be used.

Information and data can be displayed through a display 1432. Examples of a display 1432 include, but are not limited to, a liquid crystal display (LCD), an organic liquid crystal display (OLED), a cathode ray tube (CRT), a plasma display, and any combinations thereof. The display 1432 can interface to the processor(s) 1401, memory 1403, and fixed storage 1408, as well as other devices, such as input device(s) 1433, via the bus 1440. The display 1432 is linked to the bus 1440 via a video interface 1422, and transport of data between the display 1432 and the bus 1440 can be controlled via the graphics control 1421.

In addition to a display 1432, computer system 1400 may include one or more other peripheral output devices 1434 including, but not limited to, an audio speaker, a printer, and any combinations thereof. Such peripheral output devices may be connected to the bus 1440 via an output interface 1424. Examples of an output interface 1424 include, but are not limited to, a serial port, a parallel connection, a USB port, a FIREWIRE port, a THUNDERBOLT port, and any combinations thereof.

In addition or as an alternative, computer system 1400 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A server system comprising:
a network interface that receives product, service, or customer data from a client, receives a query from the client, and returns a report of social profiles to the client;
a memory storing a searchable social profile datastore having one or more social profiles;
a processor running an API, a crawler module, a parser, an analysis module, and a scoring module,
the API receives the product, service, or customer data from the client via the network interface, receives a query from the client via the network interface, and returns a report of social profiles to the client in response to the query via the network interface,
the crawler module collects content and raw data from the Internet based on the product, service, or customer data,
the parser parses the content and raw data into terms,
the analysis module computes the following for each term: a reach value and an impact value, and
the scoring module:
computes scores for one or more social profiles for each term based on the reach value and impact value; and
adds to or updates the one or more social profiles with the scores,
wherein the reach value represents a number of relationships between a user and other users as well as a quality of those relationships,
wherein the relationships are identified based on (1) explicit links between users and (2) user actions that imply relationships.

2. The server system of claim 1, wherein the analysis module comprises:
a compute reach module; and
a compute impact module.

3. The server system of claim 2, wherein the analysis module further comprises a graph builder module that maps relationships between social profiles in the searchable social profile datastore.

4. The server system of claim 3, wherein the graph builder module creates and updates a graph datastore.

5. The server system of claim 4, wherein the compute reach module computes reach values based on quantitative analysis of the graph datastore.

6. The server system of claim 4, wherein the graph datastore includes nodes representing users, and includes edges between the nodes, where the edges represent relationships between the users, and wherein the edges are weighted based on a quality of each relationship.

7. The server system of claim 6, wherein the graph builder module is further configured to merge nodes deemed to represent the same user by searching for edges that are common to at least two different nodes and further considering the weight of each of these edges.

8. The server system of claim 6, wherein a weight assigned to an edge is greater for an edge generated based on an explicit link between users than an edge generated based on user actions that imply a relationship between users.

9. The server system of claim 2, wherein reach and impact values as determined by the analysis module are used to calculate scores in the scoring module and the scores are assigned to social profiles in the searchable social profile datastore.

10. The server system of claim 1, wherein the compute impact module computes a number and quality of actions taken in response to a user's publication of content on the Internet.

11. The server system of claim 1, wherein the query includes one or more contexts describing one or more terms, and the report includes one or more social profiles having highest scores in the one or more contexts.

12. The server system of claim 1, further comprising a profile enrichment module running on the processor, the profile enrichment module assigns actual user names to the one or more social profiles in the searchable profile datastore.

13. The server system of claim 1, wherein the crawler module creates a node for every URL crawled.

14. A method for generating reports enhancing an understanding of Internet users based on their generated content and actions taken by others in response to the generated content, the method comprising:
  collecting content or other raw data via a crawler module that accesses webpages from a network interface of a server system;
  associating the content or other raw data with a social profile residing in or being added to a memory;
  calculating scores of reach and impact for the social profile based on terms parsed from the content or other raw data, wherein the reach scores are based at least in part on a number and quality of relationships between a user associated with the social profile and other users, and where the relationships are identified based on (1) explicit links between users and (2) user actions that imply relationships;
  receiving a query, via the network interface, for users fitting one or more contexts;
  identifying social profiles fitting the one or more contexts; and
  returning a report in response to the query and transmitted through the network interface, having the social profiles fitting the one or more contexts wherein an order of the social profiles is based on the scores.

15. The method of claim 14, wherein the calculating scores is performed based on relevance scores for each of the terms parsed from the content or other raw data, wherein reach depends on a number and quality of relationships between users.

16. The method of claim 14, further comprising:
  receiving another query, via the network interface, for contexts fitting one or more users;
  identifying the contexts fitting the one or more users; and
  returning another report in response to the another query and transmitted through the network interface, having the contexts.

17. A method comprising:
  seeding a crawler module;
  crawling the Internet to find new users that can be used to create new social profiles, the first crawling based on the seeding;
  crawling the Internet to further populate existing social profiles, the second crawling based on the seeding including at least consumer data from customer transactions, wherein the existing social profiles are based on existing customers of a marketing client;
  parsing content or other raw data generated by the first and second crawling into terms;
  associating the terms and the content or other raw data with the existing social profiles or the new social profiles;
  computing scores for each term based on reach and impact values for each term, where the reach values represent a number of relationships between a user and other users as well as a quality of those relationships;
  associating the scores for each term with the existing social profiles and the new social profiles;
  returning a report to the marketing client via the network interface in response to a query received via the network interface, the report including one or more social profiles matching contexts found in the query.

18. The method of claim 17, wherein computing scores for each term includes computing relevance values for each term and then computing scores for each term based on the reach, relevance, and impact values.

19. The method of claim 17, where the report includes one or more contexts.

20. The method of claim 17, wherein the marketing client provides the customer data.

* * * * *